(12) United States Patent
Baek et al.

(10) Patent No.: US 11,218,813 B2
(45) Date of Patent: *Jan. 4, 2022

(54) ELECTRONIC DEVICE AND METHOD FOR CONTROLLING OPERATION OF ELECTRONIC DEVICE

(71) Applicant: Samsung Electronics Co., Ltd., Gyeonggi-do (KR)

(72) Inventors: Inho Baek, Gyeonggi-do (KR); Yongsang Yun, Gyeonggi-do (KR); Changryong Heo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 483 days.

This patent is subject to a terminal disclaimer.

(21) Appl. No.: 15/759,027

(22) PCT Filed: Sep. 5, 2016

(86) PCT No.: PCT/KR2016/009930
§ 371 (c)(1),
(2) Date: Mar. 9, 2018

(87) PCT Pub. No.: WO2017/043828
PCT Pub. Date: Mar. 16, 2017

(65) Prior Publication Data
US 2020/0228901 A1    Jul. 16, 2020

(30) Foreign Application Priority Data

Sep. 9, 2015    (KR) .................... 10-2015-0127514

(51) Int. Cl.
*H04R 25/00*    (2006.01)

(52) U.S. Cl.
CPC ......... *H04R 25/405* (2013.01); *H04R 25/505* (2013.01); *H04R 2225/41* (2013.01);
(Continued)

(58) Field of Classification Search
CPC ............... H04R 25/405; H04R 25/505; H04R 2225/41; H04R 2420/07; H04R 2460/07; H04R 2499/13
(Continued)

(56) References Cited

U.S. PATENT DOCUMENTS

2003/0235319 A1    12/2003    Rass
2005/0009583 A1    1/2005    Cheung et al.
(Continued)

FOREIGN PATENT DOCUMENTS

CN    1774871    5/2006
CN    1953059    4/2007
(Continued)

OTHER PUBLICATIONS

European Search Report dated Aug. 14, 2018 issued in counterpart application No. 16844648.2-1221, 12 pages.
(Continued)

*Primary Examiner* — Phylesha Dabney
(74) *Attorney, Agent, or Firm* — The Farrell Law Firm, P.C.

(57) ABSTRACT

An electronic device according to an embodiment of the present disclosure may include: a housing including a portion configured to be attached to/detached from a part of the user's ear; at least one microphone included in the housing and configured to receive a sound from the outside and to detect a direction in which the sound is received; at least one speaker included in the housing; at least one communication circuit included in the housing; a processor included in the housing and electrically connected to the at least one microphone, the at least one speaker, and the at least one communication circuit; and at least one memory included in the housing and electrically connected to the processor. The memory may store instructions that, when executed, cause
(Continued)

the processor to store data regarding a sound, which has been received through the microphone, in the memory at least temporarily, to output a sound, which corresponds to a sound received from a first direction among the data, through the speaker, and to output a sound, which corresponds to a sound received from a second direction among the data, through the speaker based at least in part on information regarding the state of the electronic device or information acquired from the outside of the electronic device. Besides, various embodiments are possible.

20 Claims, 17 Drawing Sheets

(52) U.S. Cl.
 CPC ...... *H04R 2420/07* (2013.01); *H04R 2460/07* (2013.01); *H04R 2499/13* (2013.01)
(58) Field of Classification Search
 USPC .......................................................... 381/313
 See application file for complete search history.

(56) References Cited

U.S. PATENT DOCUMENTS

| | | | |
|---|---|---|---|
| 2006/0182294 A1 | 8/2006 | Grasbon et al. | |
| 2010/0189293 A1* | 7/2010 | Imamura | H04R 25/558 381/317 |
| 2013/0329924 A1 | 12/2013 | Fleizach et al. | |
| 2013/0337786 A1 | 12/2013 | Park | |
| 2014/0064511 A1 | 3/2014 | Desai | |
| 2014/0211972 A1 | 7/2014 | Kim et al. | |
| 2015/0023536 A1 | 1/2015 | Scheller | |
| 2015/0172831 A1 | 6/2015 | Dittberner et al. | |
| 2016/0174001 A1 | 6/2016 | Ungstrup et al. | |

FOREIGN PATENT DOCUMENTS

| | | |
|---|---|---|
| CN | 103517191 | 1/2014 |
| EP | 2 830 329 | 1/2015 |
| EP | 2884766 | 6/2015 |
| JP | 2008158254 | 7/2008 |
| KR | 101369272 | 3/2014 |
| KR | 1020140098615 | 8/2014 |
| WO | WO 2015/024584 | 2/2015 |

OTHER PUBLICATIONS

Chinese Office Action dated Aug. 24, 2020 issued in counterpart application No. 201680051342.3, 31 pages.
PCT/ISA/210 Search Report issued on PCT/KR2016/009930 (pp. 3).
PCT/ISA/237 Written Opinion issued on PCT/KR2016/009930 (pp. 10).

* cited by examiner

ELECTRONIC DEVICE AND METHOD FOR CONTROLLING OPERATION OF ELECTRONIC DEVICE

PRIORITY

This application is a National Phase Entry of PCT International Application No. PCT/KR2016/009930 which was filed on Sep. 5, 2016, and claims priority to Korean Patent Application No. 10-2015-0127514, which was filed on Sep. 9, 2015, the content of each of which is incorporated herein by reference.

TECHNICAL FIELD

Various embodiments of the present disclosure relate to a method and an electronic device for controlling an operation of an electronic device based on at least some of information associated with the electronic device and/or information acquired from an outside of the electronic device.

BACKGROUND ART

Various electronic devices have been used in daily life in recent years. In particular, there are many cases where a single user carries and utilizes various electronic devices. For example, a user may carry and utilize portable terminals (e.g., mobile phone, tablet, or the like), wearable devices (e.g., smart watch, smart band, or the like), and an electronic device receiving outer sounds and outputting the received sounds to a user, that is, an auditory device (e.g., hearing aids). Accordingly, researches into technologies of inter-working various electronic devices with each other to provide various contents or functions have been continuously conducted. For example, the auditory device may receive and output sound data from other electronic devices (e.g., portable terminal).

DISCLOSURE OF INVENTION

Technical Problem

An electronic device (e.g., hearing device) may manually change its own setting each time in response to a user's input when the user's surroundings or the surrounding circumstances are changed.

An object of the present disclosure is directed to provision of an electronic device and a method of controlling an operation of an electronic device capable of adjusting parameters for filtering directivity and/or sound for receiving the sound based on at least some of acquired information.

Solution to Problem

Various embodiments of the present disclosure are directed to the provision of an electronic device including: a housing including a portion configured to be attached to/detached from a part of the user's ear; at least one microphone included in the housing and configured to receive a sound from the outside and to detect a direction in which the sound is received; at least one speaker included in the housing; at least one communication circuit included in the housing; a processor included in the housing and electrically connected to the at least one microphone, the at least one speaker, and the at least one communication circuit; and at least one memory included in the housing and electrically connected to the processor. The memory may store instructions that, when executed, cause the processor to store data regarding a sound, which has been received through the microphone, in the memory at least temporarily, to output a sound, which corresponds to a sound received from a first direction among the data, through the speaker, and to output a sound, which corresponds to a sound received from a second direction among the data, through the speaker based at least in part on information regarding the state of the electronic device and/or information acquired from the outside of the electronic device.

Various embodiments of the present disclosure are directed to the provision of a method of controlling an operation of an electronic device including: an operation of at least temporarily storing data regarding a sound received through a microphone; an operation of outputting a sound corresponding to a sound received from a first direction among the data through a speaker; and an operation of outputting a sound corresponding to a sound received from a second direction among the data through the speaker based at least in part on information regarding a state of the electronic device and/or information acquired from an outside of the electronic device.

Advantageous Effects of Invention

According to the embodiment of the present disclosure, the electronic device and the method for controlling an operation of the electronic device can increase the convenience of the user by dynamically changing the setting according to the user's surrounding environment.

MODE FOR THE INVENTION

Figure 1:
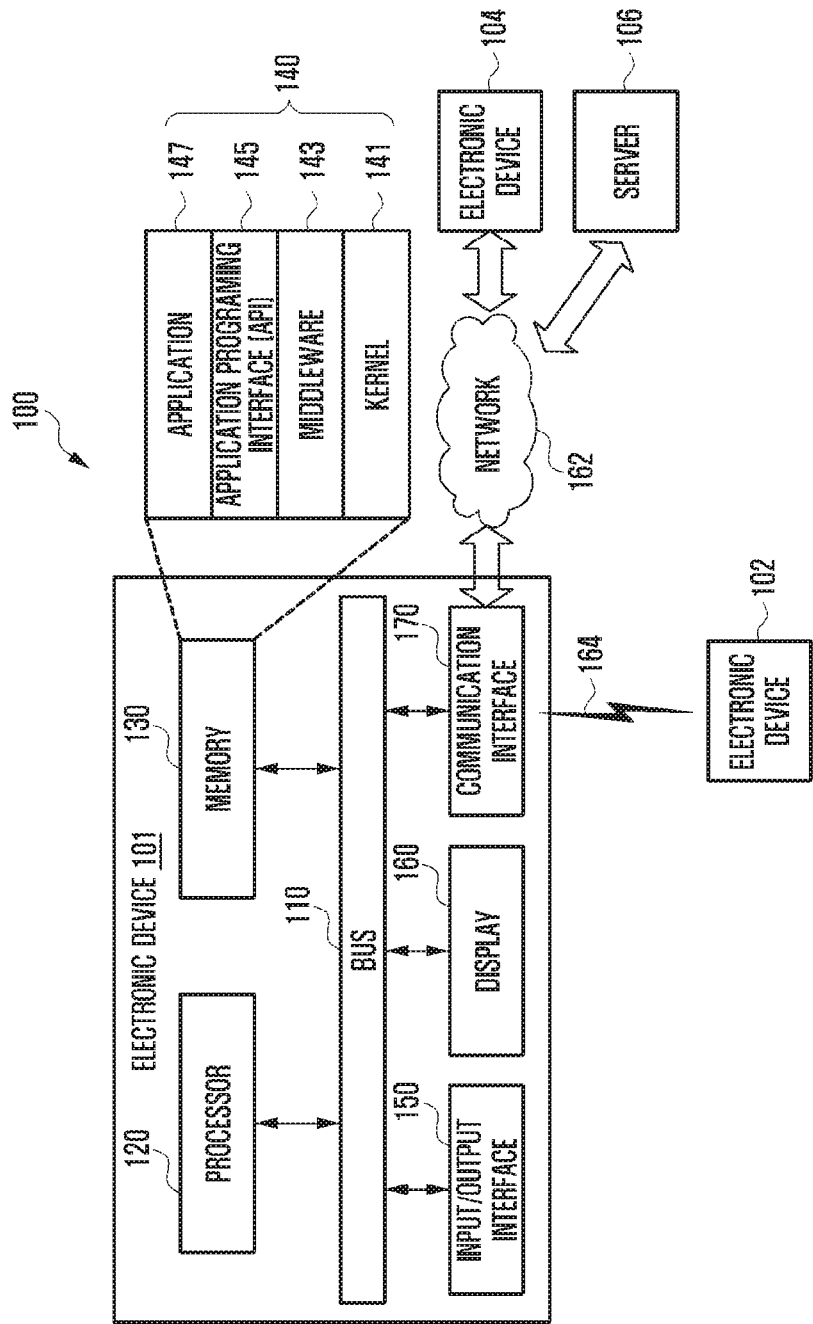
FIG. 1 is a diagram illustrating an electronic device within network environment according to various embodiments of the present disclosure.

Hereinafter, various embodiments of the present document will be described with reference to the accompanying drawings. It is to be understood that the content disclosed in the present document is not intended to limit the scope of the present disclosure and therefore includes various modifications, equivalents, and/or alternatives of the embodiments of the present document. With reference to descriptions of the accompanying drawings, similar components may be denoted by similar reference numerals.

In the present document, expressions of "have", "may have", "include", "may include", or the like, indicate existence of a corresponding feature (e.g., a numerical value, a function, an operation, a component such as a part), and does not exclude existence of an additional feature.

In the present document, "A or B", expressions such as "at leas one of A or/and B", "one or more of A or/and B", or the like may include all the possible combination of terms listed together. For example, "A or B", expressions such as "at leas one of A or/and B", "one or more of A or/and B", or the like may represent cases of (1) including at least one A, (2) including at least one B, or (3) including both of at least one A and at least one B.

Expressions of "first", "second", "No. 1", "No. 2", or the like used in the present document may represent various components regardless of a sequence and/or importance and are just used to differentiate one component and another components from each other and therefore does not limit the corresponding components. For example, a first user device and a second user device may indicate different user devices regardless of a sequence or importance thereof. For example, the 'first' component may be named the 'second' component and the 'second' component may also be similarly named the 'first' component, without departing from the scope described in the present document.

When it is mentioned that any component (for example, a first component) is (operatively or communicatively) connected with/to another component (for example, a second component), it is to be understood that any component is directly connected to another component or may be connected to another component through the other component (for example, a third component). On the other hand, it may be understood that when any component (e.g., first component) is "directly connected" or "directly coupled" to another component (e.g., second component), there is no another component (e.g., third component) between any component and another component.

An expression "configured (or set) to" used in the present document may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "an apparatus configured to" may mean that the apparatus may "do" together with other apparatuses or components. For example, the sentence "processor configured (or configured) to perform A, B, and C" is a dedicated processor (for example: embedded processor) for performing the corresponding operation or is a generic processor (for example: CPU or application processor) executing at least one software program stored in a memory device to be able to perform the corresponding operations.

The terminologies used herein is for the purpose of describing particular embodiments only and may not be intended to limit the scope of other embodiments. Singular forms may be intended to include plural forms unless the context clearly indicates otherwise. It is to be understood that all the terms used in the present document including technical and scientific terms have the same meanings as those that are generally understood by those skilled in the art. Terms defined in a general dictionary among terms used in the present document can be interpreted as having the same or similar meaning as the contextual meanings of the related art and unless explicitly defined in the present document, are not interpreted as an ideal or excessively formal meaning. In some cases, the terms defined herein may not be construed to exclude exemplary embodiments of the present document.

An electronic device according to various embodiments of the present document may include, for example, an auditory device (e.g., hearing aids, etc.). For example, the auditory device may include a housing including a portion configured to be attached to/detached from a portion of a user.

An electronic device according to various embodiments of the present document may include, for example, at least one of a smartphone, a tablet, a tablet personal computer (PC), a mobile phone, a video phone, an e-book reader, a desktop personal computer, a laptop personal computer, a netbook computer, a workstation, a server, a personal digital assistant (PDA), a portable multimedia player (PMP), an MP3 player, a mobile medical instrument, a camera, and a wearable device. According to various embodiments, the wearable device may include at least one of an accessory type (e.g., watch, ring, bracelet, anklet, necklace, glasses, contact lens, or head-mounted-device (HMD)), a fabric or clothes-integrated type (e.g., electronic clothes), a body-attached type (e.g., skin pad or tattoo), and an implantable circuit.

In some embodiments, the electronic device may be a home appliance. The home appliance may include at least one of, for example, a television, a digital video disk (DVD) player, an audio, a refrigerator, an air conditioner, a cleaner, an oven, a microwave range, a washing machine, an air cleaner, a set-top box, a home automation control panel, a security control panel, a TV box (e.g., Samsung HomeSync™, apple TV™, or Google TV™), a game console (e.g., Xbox™, PlayStation™), an electronic dictionary, an electronic key, a camcorder, and a digital photo frame.

In other embodiments, the electronic device may include at least one of various medical equipments (e.g.: various portable medical measurement equipments, (blood sugar measurement equipment, heart rate measurement equipment, blood pressure measurement equipment, and body temperature measurement equipment), magnetic resonance angiography (MRA), magnetic resonance imaging (MRI), computed tomography (CT), moving picture camera, ultrasonic instrument, or the like), a navigation device, a global navigation satellite system (GNSS), an event data recorder (EDR), a flight data recorder (FDR), a vehicle infortainment device, electronic equipment for ship (e.g.: navigation device for ship, gyro compass, or the like), avionics, security equipment, a head unit for a vehicle, an industrial or home robot, automatic teller's machine (ATM) of financial institution, point of sales (POS) of shop, or internet of things (e.g., bulb, various sensors, electricity or gas meter, sprinkler device, a fire alarm device, a thermostat, a streetlight, a toaster, sporting equipment, a hot water storage tank, a heater, a boiler, or the like).

According to any embodiment, the electronic device may include at least one of furniture, a part of building/structure, an electronic board, an electronic signature receiving device, a projector, or various measurement equipment (for example, water, electricity, gas, or radio wave measurement device, or the like). In various embodiments, the electronic device may be a combination of at least one of various devices as described above. The electronic device according to some embodiments may be a flexible electronic device. In addition, the electronic device according to the embodiment in the present document is also not limited to the above-described devices, and may include new electronic devices according to technological advancement.

Hereinafter, an electronic device according to various embodiments will be described with reference to the accompanying drawings. In the present document, the term user may indicate a person using an electronic device or a device (e.g.: artificial intelligence electronic device) using an electronic device.

According to various embodiments, an electronic device 101 within network environment 100 will be described with reference to FIG. 1. The electronic device 101 may include a bus 110, a processor 120, a memory 130, an input/output interface 150, a display 160, and a communication interface 170. In any embodiment, the electronic device 101 may not include at least one of the components or the electronic device 101 may further include other components.

The bus 110 may connect between, for example, the components 110 to 170 and may include a circuit providing communication (e.g., control message and/or data) between the components.

The processor 120 may include one or more of a central processing unit (CPU), an application processor (AP), a communication processor (CP). The processor 120 may perform, for example, an operation or data processing on a control and/or communication of at least one of the other components of the electronic device 101.

The memory 130 may include a volatile and/or a non-volatile memory. The memory 130 may store, for example, commands or data associated with at least one of the other components of the electronic device 101. According to one embodiment, the memory 130 may store software and/or program 140. The program 140 may include, for example, a kernel 141, middleware 143, an application programming interface (API) 145, and/or an application program (or "application") 147, or the like. At least a part of the kernel 141, the middleware 143, and the API 145 may be called an operating system (OS).

The kernel 141 may control or manage, for example, system resources (e.g.: bus 110, processor 120, memory 130, or the like) used to execute operations or functions implemented in other programs (e.g.: middleware 143, API 145, or application program 147). Further, the kernel 141 may access individual components of the electronic device 101 in the middleware 143, the API 145, or the application program 147 to provide an interface that may control or manage system resources.

The middleware 143 may serve as a relay to transmit and receive data by providing communication between the API 145 or the application program 147 and the kernel 141.

Further, the middleware 143 may process at least one of work requests received from the application program 147 depending on priority. For example, the middleware 143 may allocate priority which may use the system resource (e.g., bus 110, processor 120, memory 130, or the like) of the electronic device 101 to at least one of the application programs 147. For example, the middleware 143 may process at least one of the work requests based on the priority allocated to at least one of the application programs 147 to perform scheduling, load balancing, or the like on at least one of the work requests.

The API 145 is an interface which allows the application 147 to control functions provided from the kernel 141 or the middleware 143 and may include, for example, at least one interface or function (for example, commands) for a file control, a window control, image processing, a character control, or the like.

The input/output interface 150 may serve as an interface through which, for example, commands or data input from a user or other external devices can be transferred to another component (s) of the electronic device 101. Further, the input/output interface 150 may output commands or data received from another component (s) of the electronic device 101 to a user or other external devices.

The display 160 may include, for example, a liquid crystal display (LCD), a light emitting diode (LED) display, an organic light emitting diode (OLED) display, a micro electro mechanical systems (MEMS) display, or an electronic paper display. The display 160 may display, for example, various contents (e.g., text, image, video, icon, symbol, or the like) to a user. The display 160 may include a touch screen and for example, may receive a touch, a gesture, proximity, or a hovering input using an electronic pen or a part of a user's body.

The communication interface 170 may set, for example, communication between the electronic device 101 and external devices (for example, first external electronic device 102, second external electronic device 104, or server 106). For example, the communication interface 17 may be connected to a network 162 through wireless communication or wired communication to communicate with the external device (for example, second external electronic device 104 or server 106).

The wireless communication may be, for example, cellular communication. As the wireless communication, at least one of, for example, LTE, LTE-advance (LTE-A), code division multiple access (CDMA), wideband CDMA (WCDMA), universal mobile telecommunications system (UMTS), wireless broadband (WiBro), global system for mobile communications (GSM), or the like may be used. In addition, the wireless communication may also include, for example, local area communication 164. The local area communication 164 may include at least one of, for example, wireless fidelity (WiFi), Bluetooth, near field communication (NFC), or global navigation satellite system (GNSS). The GNSS may be, for example, global positioning system (GPS), global navigation satellite system (Glonass), Beidou navigation satellite system (hereinafter, "Beidou"), Galileo, or the European global satellite-based navigation system according to a use area, a bandwidth, or the like. Hereinafter, in the present document, the "GPS" may be interchangeably used with the "GNSS". The wired communication may include at least one of, for example, a universal serial bus (USB), a high definition multimedia interface (HDMI), recommended standard 232 (RS-232), plain old telephone service (POTS) or the like. The network 162 may include a telecommunication network, for example, at least one of a computer network (e.g., LAN or WAN), the Internet, and a telephone network.

The first and second external electronic devices 102 and 104 may each be the same or different kinds of devices as or from the electronic device 101. According to one embodiment, the server 106 may comprise one or more groups of servers. According to various embodiments, all or a part of the operations executed in the electronic device 101 may be executed in another electronic device or a plurality of electronic devices (for example, electronic devices 102 and 104 or server 106). According to one embodiment, when the electronic device 101 automatically performs any function or service or performs any function or service according to a request, the electronic device 101 itself does not execute functions or services but may additionally request at least a part of the functions associated therewith to other devices (e.g.: electronic devices 102 and 104 or server 106). Other electronic devices (e.g.: electronic devices 102 and 104 or server 106) may execute the requested functions or additional functions and may transfer the result to the electronic device 101. The electronic device 101 may process the received result as it is or additionally to provide the requested functions or services. For this purpose, for example, cloud computing, distributed computing, or client-server computing technology may be used.

Figure 2:
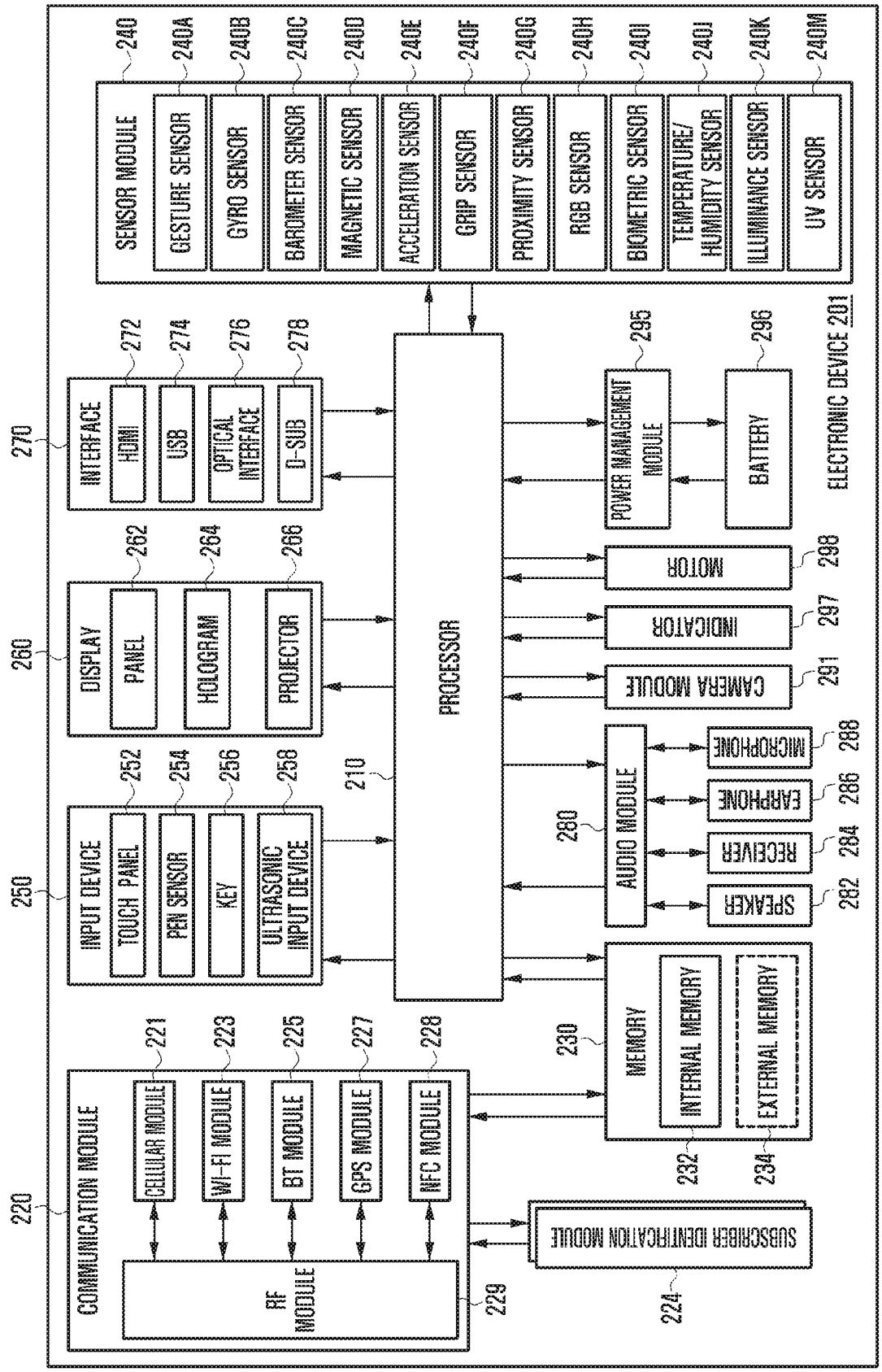
FIG. 2 is a block diagram of the electronic device according to various embodiments of the present disclosure.

FIG. 2 is a block diagram of an electronic device 201 according to various embodiments of the present disclosure. The electronic device 201 may include, for example, all or a part of the electronic device 101 illustrated in FIG. 1. The electronic device 201 may include at least one processor (e.g., application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or an application program to control a plurality of hardware or software components connected to the processor 210 and may perform various data processings and operations. The processor 210 may be implemented by, for example, a system on chip (SoC). According to one embodiment, the processor 210 may further include a graphic processing unit (GPU) and/or an image signal processor. The processor 210 may also include at least a part (e.g.: cellular module 221) of the components illustrated in FIG. 2. The processor 210 may load commands or data received from at least one of other components (e.g., non-volatile memory) in a volatile memory and process the commands or data and may store various data in the non-volatile memory.

The communication module 210 may have the same or similar configuration as or to the communication module 220 of FIG. 1. The communication module 220 may include, for example, a cellular module 221, a WiFi module 223, a Bluetooth module 225, a GPS module 227 (e.g., GPS module, Glonass module, Beidou module, or Galileo module), an NFC module 228, and an RF module 229.

The cellular module 221 may provide, for example, voice communication, video communication, a text messaging service, an Internet service, or the like, through a communication network. According to one embodiment, the cellular module 221 may use a subscriber identification module (e.g., SIM card) 224 to perform identification and authentication of the electronic device 210 within the communication network. According to one embodiment, the cellular module 221 may perform at least a part of the functions that may be provided from the processor 210. According to one embodiment, the cellular module 221 may include a communication processor (CP).

Each of the WiFi module 223, the Bluetooth module 225, the GPS module 227, and the NFC module 228 may include, for example, a processor for processing data transmitted and received through the corresponding module, for example. According to any embodiment, at least a part (e.g., two or more) of the cellular module 221, the WiFi module 223, the Bluetooth module 225, the GPS module 227, or the NFC module 228 may be included in one integrated chip (IC) or an IC package.

The RF module 229 may transmit and receive, for example, a communication signal (e.g.: RF signal). The RF module 229 may include, for example, a transceiver, a power amp module (PAM), a frequency filter, a low noise amplifier (LNA), an antenna, or the like. According to another embodiment, at least one of the cellular module 221, the WiFi module 223, the Bluetooth module 225, the GPS module 227, and the NFC module 228 may transmit and receive the RF signal through the separate RF module.

The subscriber identification module 224 may include, for example, a card including a subscriber identification module or an embedded SIM and include unique identification information (e.g., integrated circuit card identifier (ICCID)) or subscriber information (e.g., international mobile subscriber identity (IMSI)).

The memory 230 (e.g., memory 130) may include, for example, an internal member 232 or an external memory 234. The internal memory 232 may include, for example, at least one of a volatile memory (e.g., dynamic RAM (DRAM), static RAM (SRAM), synchronous dynamic RAM (SDRAM) or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash, NOR flash or the like), a hard drive, and a solid state drive (SSD).

The external memory 234 may include a flash drive, for example, compact flash (CF), secure digital (SD), micro secure digital (Micro-SD), mini secure digital (Mini-SD), extreme digital (xD), a multi media card (MMC), a memory stick, or the like. The external memory 234 may be functionally or physically connected to the electronic device 201 through various interfaces.

The sensor module 240 may measure, for example, a physical amount or detect an operation state of the electronic device 201 to convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. In any embodiment, the electronic device 201 is a part of the processor 210 or separately may further include a processor configured to control the sensor module 240, such that the processor 210 may control the sensor module 240 while being in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Further, the touch panel 252 may further include a control circuit. The touch panel 252 may further a tactile layer to provide a tactile reaction to a user.

The (digital) pen sensor 254 may be, for example, a part of the touch panel or may include a separate recognition sheet. The key 256 may include, for example, a physical button, an optical key, or a keypad. The ultrasonic input device 258 may detect an ultrasonic wave generated from an input tool through a microphone (e.g., mike 288) to confirm data corresponding to the detected ultrasonic wave.

The display 260 (e.g.: display 160) may include a panel 262, a hologram device 264, or a projector 266. The panel 262 may include the same or similar configuration as or to the display 160 of FIG. 1. The panel 262 may be implemented to be, for example, flexible, transparent, or wearable. The panel 262 may also be configured as at least one module with the touch panel 252. The hologram device 264 may use an interference of light to display a three-dimensional image in the air. The projector 266 may project light on a screen to display an image. The screen may be positioned, for example, inside or outside the electronic device 201. According to one embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert, for example, a sound and an electrical signal bilaterally. At least a part of the components of the audio module 280 may be included in, for example, the input/output interface 145 illustrated in FIG. 1. The audio module 280 may process sound information which is input or output through, for example, a speaker 282, a receiver 284, an ear phone 286, a microphone 288, or the like.

The camera module 291 is, for example, a device that may photograph a still image and a moving image. According to one embodiment, the camera module 291 may include at least one image sensor (e.g., front sensor or rear sensor), a lens, an image signal processor (ISP), or a flash (e.g., LED, xenon lamp or the like).

For example, the power management module 295 may manage power of the electronic device 201. According to one embodiment, the power management module 295 may include a power management integrated circuit (PMIC), a charging IC, or a battery or a fuel gauge. The PMIC may be a wired and/or wireless charging type. The wireless charging type may include, for example, a magnetic resonance type, a magnetic induction type, an electromagnetic wave type, or the like and may further include an additional circuit for wireless charging, for example, a coil loop, a resonance circuit, a rectifier, or the like. The battery gauge may measure, for example, a residual quantity of the battery 296 and a voltage, a current, or a temperature while the battery 296 is charged. The battery 296 may include, for example, a chargeable battery and/or a solar cell.

The indicator 297 may display a specific state of the electronic device 201 or a part (e.g., processor 210) of the electronic device 201, for example, a booting state, a message state, a charging state, or the like. The motor 298 may convert an electrical signal into a mechanical vibration and generate a vibration, a haptic effect, or the like. Although not illustrated, the electronic device 201 may include a processing unit (e.g., a GPU) for mobile TV support. The processing device for the mobile TV support may process media data conforming to standards such as digital multimedia broadcasting (DMB), digital video broadcasting (DVB), or media flow (mediaFlo™).

According to one embodiment, the electronic device 201 (e.g., auditory device) may have a structure in which at least some of the components shown in FIG. 2 are omitted.

Each of the components described in the present document may be configured as one or more component and names of the corresponding components may be changed according to a kind of electronic device. The electronic device according to various embodiments of the present disclosure may be configured to include at least one of the foregoing components and may not have some components or may further include other additional components. Further, some of the components of the electronic device according to various embodiments of the present disclosure are combined to be configured as one entity and thus may identically perform the functions of the corresponding components before being combined.

Figure 3:
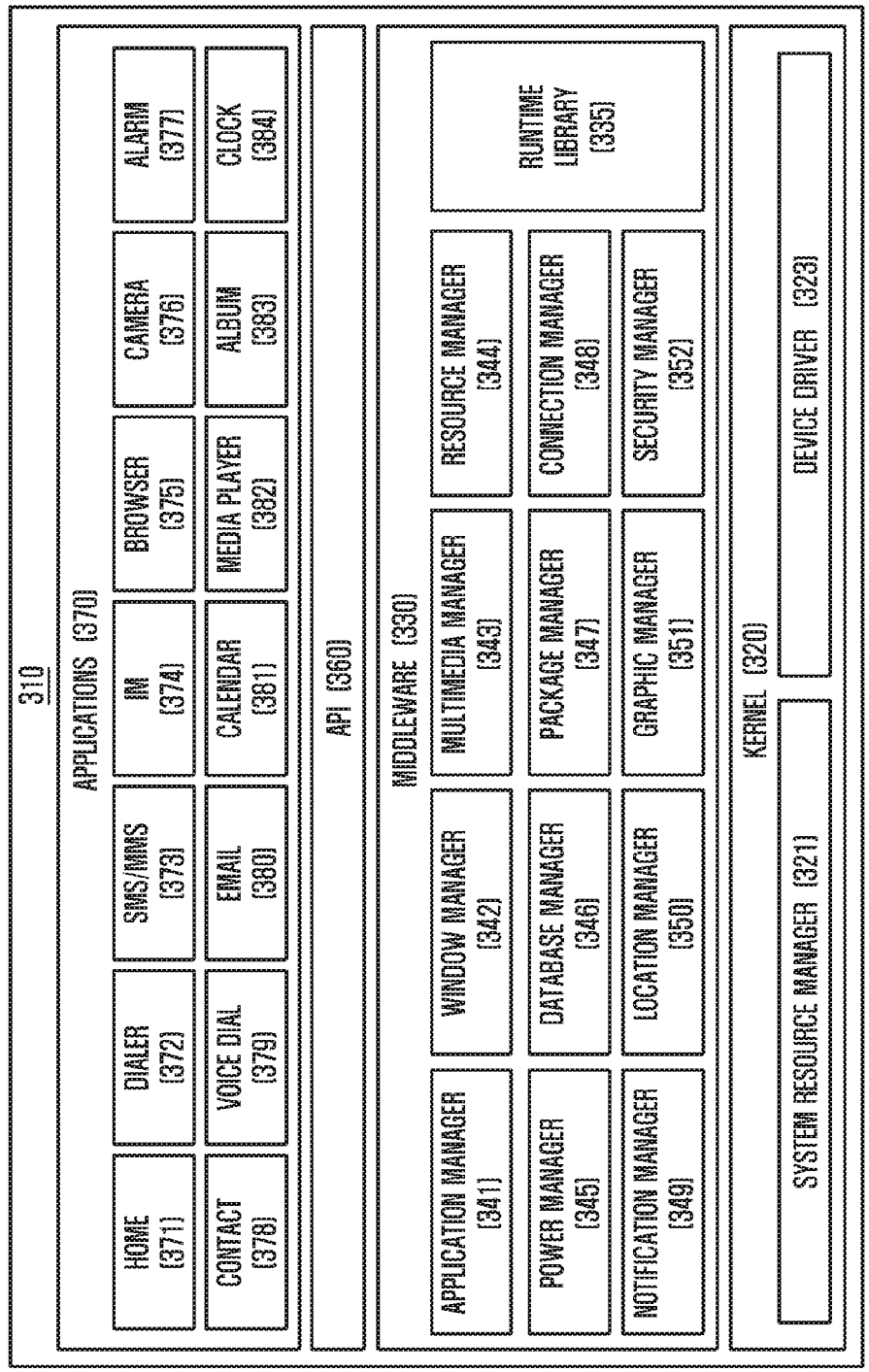
FIG. 3 is a block diagram of a program module according to various embodiments of the present disclosure.

FIG. 3 is a block diagram of a program module according to various embodiments of the present disclosure. According to one embodiment, a program module 310 (e.g., program 140) may include an operating system (OS) controlling resources associated with the electronic device (e.g.: electronic device 101) and/or various applications (e.g.: application program 147) driven on the operating system. The operating system may be, for example, android, iOS, windows, symbian, tizen, bada, or the like.

The program 310 may include, for example, a kernel 320, middleware 330, an application programming interface (API) 360, and/or an application program (or "application") 370. At least a part of the program module 310 can be preloaded on the electronic device or downloaded from the external electronic device (e.g., electronic devices 102 and 104, server 106, or the like).

The kernel 320 (e.g.: kernel 141) may include, for example, a system resource manager 321 and/or a device driver 323. The system resource manager 321 may perform a control, an allocation, a recovery or the like of the system resource. According to one embodiment, the system resource manager 321 may include a process manager, a memory manager, a file system manager or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide, for example, a function commonly required by the application 370 and provide various functions to the application 370 through the API 360 so that the application 370 may efficiently use limited system resources in the electronic device. According to one embodiment, the middleware 330 (e.g., middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module used by a compiler to add a new function through a programming language while the application 370 is executed. The run time library 335 may execute functions of input/output management, memory management, or arithmetic function, or the like.

The application manager 341 may manage, for example, a life cycle of at least one of the applications 370. The window manager 342 may manage a GUI resource used on a screen. The multimedia manager 343 may figure out a format required to play various media files and encode or decode the media files using a codec suited to the corresponding format. The resource manager 344 may manage resources such as a source code, a memory, and a storage space of at least one of the applications 370.

The power manager 345 may operate in conjunction with, for example, a basic input/output system (BIOS) or the like to manage a battery or a power supply and provide power information and the like necessary for the operation of the electronic device. For example, the database manager 346 may generate, search, or change a database which will be used in at least one of the applications 370. The package manager 347 may manage an installation or an update of the application which is distributed in a form of a package file.

The connectivity manager 348 may manage, for example, a wireless connection such as WiFi and Bluetooth. The notification manager 349 may display or notify events such as arrival message, appointment, and proximity notification in a manner that the events do not disturb a user. The location manager 350 may manage location information of the electronic device. The graphic manager 351 may manage a graphic effect to be provided to a user or a user interface associated therewith. The security manager 352 may provide all security functions necessary for system security, user authentication or the like. According to one embodiment, when the electronic device (e.g., electronic device 101) includes a telephone function, the middleware 330 may further include a telephony manager for managing a voice or video call function of the electronic device.

The middleware 330 may include a middleware module that forms a combination of various functions of the above-described components. The middleware 330 may provide a module specialized for each type of operating system in order to provide differentiated functions. In addition, the middleware 330 may dynamically delete some of the existing components or add new components.

The API 360 (e.g., API 145) is, for example, a set of API programming functions and may be provided as different configurations according to the operating system. For example, in the case of the android or the iOS, one API set for each platform may be provided and in the case of the Tizen, at least two API sets for each platform may be provided.

The application 370 (e.g., application program 147) may include at least one application which may provide functions of, for example, a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, a health care (e.g.: measurement of momentum, blood sugar, or the like), or provision of environment information (e.g.: provision of atmospheric pressure, humidity, or temperature information).

According to one embodiment, the application 370 may include an application (hereinafter, for convenience of explanation, "information exchange application") which supports information exchange between the electronic devices (e.g.: electronic device 101) and the external electronic device (e.g.: electronic devices 102 and 104). The information exchange application may include, for example, a notification relay application for transferring specific information to the external electronic device or a device management application for managing the external electronic device.

For example, the notification relay application may include a function of transferring notification information generated from other applications (e.g., SMS/MMS application, e-mail application, health care application, environmental information application or the like) of the electronic device to external electronic devices (e.g., 102 and 104). Further, the notification relay application may receive the notification information from the external electronic devices, for example, and provide the received notification information to the user.

The device management application may manage (e.g.: install, delete, or update) at least one function (e.g.: turn-on/turn-off of the external electronic device itself (or, some components) or adjustment of brightness (or resolution) of a display) of the external electronic devices (e.g.: electronic devices 102 and 104) communicating with the electronic device and applications operated in the external electronic devices or services (e.g.: communication service, message service or the like) provided from the external electronic devices.

According to one embodiment, the application 370 may include applications (e.g., health care application of mobile medical equipment or the like) designated according to attributes of the external electronic devices (e.g., electronic devices 102 and 104). According to one embodiment, the application 370 may include applications received from the external electronic device (e.g., server 106 or electronic devices 102 and 104). According to one embodiment, the application 370 may include a preloaded application or a third party application which can be downloaded from the server. Names of the components of the program module 310 according to the illustrated embodiment may be changed according to a type of operating systems.

According to various embodiments, at least some of the program module 310 may be implemented as software, firmware, hardware, or a combination of at least two of them. At least some of the programming module 310 may be implemented (executed) by the processor (e.g., processor 210), for example. At least some of the programming module 310 may include, for example, modules, programs, routines, sets of instructions, processes, or the like to perform at least one function.

Figure 4:
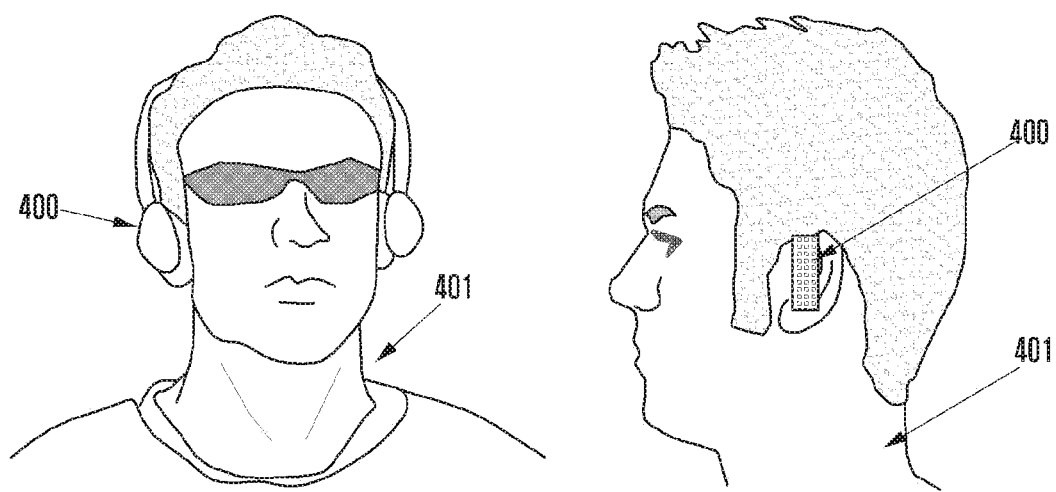
FIG. 4 is a diagram illustrating a use example of the electric device according to various embodiments of the present disclosure.

FIG. 4 is a diagram illustrating a use example of an electric device 400 according to various embodiments of the present disclosure.

The electronic device 400 (e.g., auditory device) may provide sound information to a user 401. For example, the electronic device 400 may amplify surrounding sound information when the user 401 listens to music, talks on the phone, or has a conversation with someone and provide the amplified sound information to the user 401. The electronic device 400 puts on a part of a body of the user 401, and thus a receiver (e.g., speaker) of the electronic device 400 may provide the sound information to the vicinity of ears of the user 401. The electronic device 400 may take various forms according to a use purpose of the personal user 401 and may provide various functions. The electronic device 400 may include, for example, a headset, a headphone, an earpiece, hearing aids, or personal sound amplification products. An example of the hearing aids may include various kinds of hearing aids such as behind-the-ear (BTE), receiver-in-canal (RIC), in-the-ear (ITE), in-the-canal (ITC), completely-in-canal (CIC) or the like.

Figure 5:
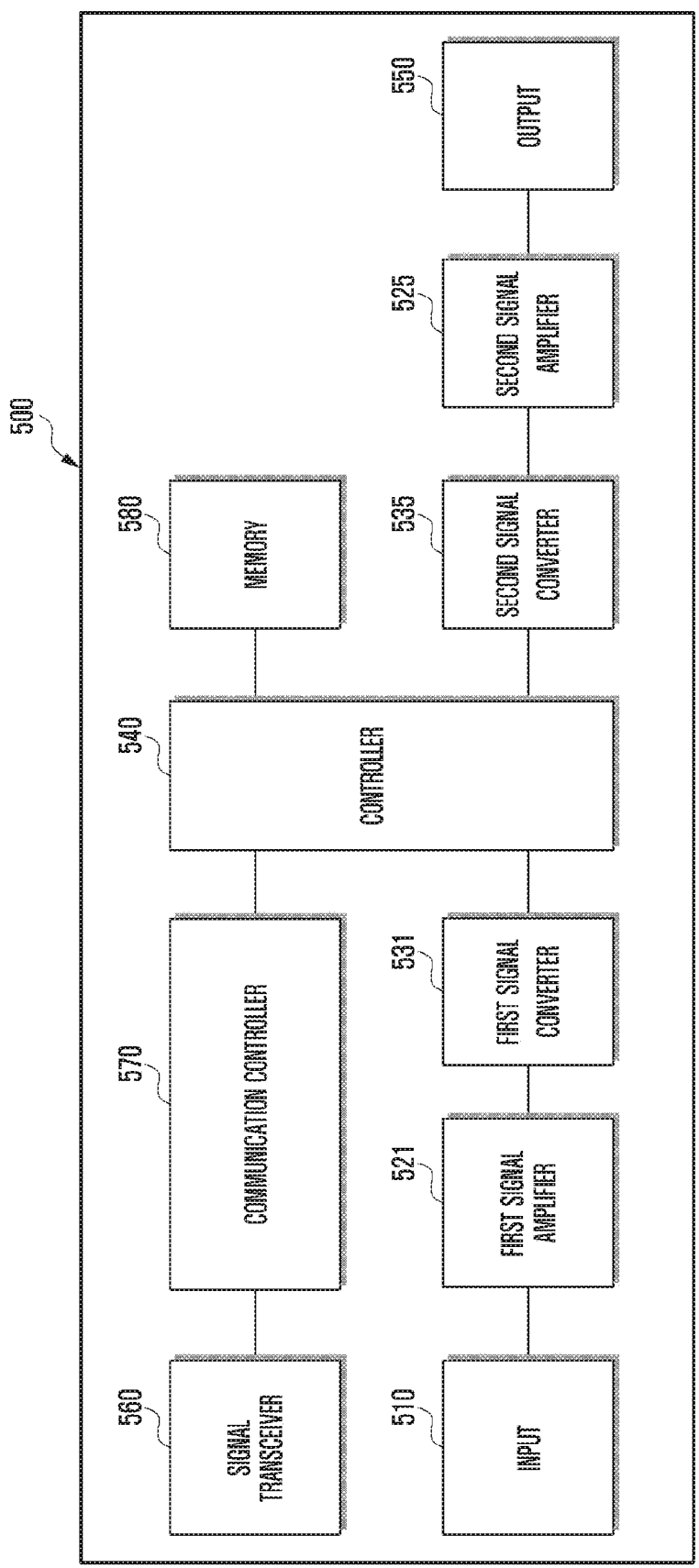
FIG. 5 is a block diagram of the electric device according to various embodiments of the present disclosure.

FIG. 5 illustrates a block diagram of an electric device 500 according to various embodiments of the present disclosure.

According to one embodiment, the electronic device 500 may have the same or similar components as or to the electronic devices 101 and 201 illustrated in FIGS. 1 and 2. For example, the electronic device 500 may include all or a part of the components of the electronic devices 101 and 201 illustrated in FIGS. 1 and 2.

The electronic device 500 may include an input 510 (e.g., microphone (Mic)), signal amplifiers 521 and 525, signal converters 531 and 535, a processor 540, an output 550 (e.g., receiver or speaker), a signal transceiver 560, a communication module 570, and a memory 580.

The electronic device 500 may acquire the sound information through the input 510. For example, the input 510 may receive a sound around the electronic device 500 to generate an input signal. According to one embodiment of the present disclosure, the input 510 may include at least one microphone.

The electronic device 500 may further include the signal amplifiers 521 and 525 (for example, amplifier (AMP)). The signal amplifiers 521 and 525 may amplify an analog signal. According to one embodiment, the signal amplifiers 521 and 525 may include a first signal amplifier 521 (e.g., pre-AMP) that amplifies a signal input through the input 510 and a second signal amplifier 525 (e.g., power AMP) that amplifies the signal processed by the processor 540 and transmits the amplified signal to the output.

The electronic device 500 may be connected to the external electronic devices (e.g., mobile device, cellular phone, tablet, or the like) or the network in a wired or wireless manner. For example, in the case of the wireless connection, the electronic device 500 may receive the input signal through the signal transceiver 560. According to one embodiment, the signal transceiver 560 may include at least one antenna.

The communication module 570 may process (e.g., application of an audio filter, amplification of a signal or the like) the input signal received through the signal transceiver 560 and transmit the processed input signal to the processor 540.

The processor 540 may process (e.g., application of an audio filter or amplification of a signal) the input signal to output a sound through the output. For example, the processor 540 may process the input signal received from the input 510 or the communication module 570 to output the sound through the output.

According to one embodiment, the processor 540 may differently configure a signal processing (for example, application of an audio filter, amplification of a signal or the like) scheme depending on the input signal received through the communication module 570 or the input 510. The processor 540 may establish a signal path (e.g., audio signal path or sound signal path) depending on whether the input signal of the communication module 570 or the input 510 is present. For example, if the input signal is input to the processor 540 through the input 510, the processor 540 may establish the signal path of the input 510 as the output and output the sound. For example, if the input signal is input to the processor 540 through the communication module 570, the processor 540 may establish the signal path of the communication module 570 as the output. For example, the processor 540 may change the signal path from the signal path through the input 510 to the signal path through the communication unit according to a scheme of receiving an input signal.

For example, the processor 540 may measure a magnitude in power in each time interval to confirm whether the input signal through the input 510 is present. According to one embodiment, the processor 540 may analyze the input signal to determine a mode to be performed, when the input signal is present. For example, the processor 540 may determine whether the input signal is a signal of a user or a thing or is a signal similar to a signal registered in a database (DB). According to one embodiment, the processor 540 may change the mode of the electronic device 500 depending on the sound information of the input signal. For example, if it is determined that the input signal is noise, the electronic device 500 may remove the input signal (i.e., noise). For example, if the input signal is not generated beyond a specific value for a predetermined time, the processor 540 may operate at least a part of the electronic device 500 in a low power mode.

According to one embodiment, the electronic device 500 may include the signal converters 531 and 535. For example, the signal converters 531 and 535 may include a first signal converter 531 (e.g., analog-digital converter (ADC)) that converts an analog signal input through the input 510 into a digital signal and a second signal converter 535 (e.g., digital-analog converter (DAC)) that converts the digital signal into the analog signal output through the output.

The memory 580 may store information (e.g., voice information of a user, information on a sound (signal) of a specific thing or the like) for determining a kind of input signals. The memory 580 may store mode information, function information, and auditory parameters of the electronic device 500. The auditory parameters may include, for example, information regarding a noise attenuation quantity, a filter value, a passing frequency, a cut-off frequency, a sound amplification value, directivity, fitting parameters for each user, or the like.

The memory 580 may store at least one command that is executed by the processor 540 and controls the electronic device 500 to perform the corresponding function.

Figure 6:
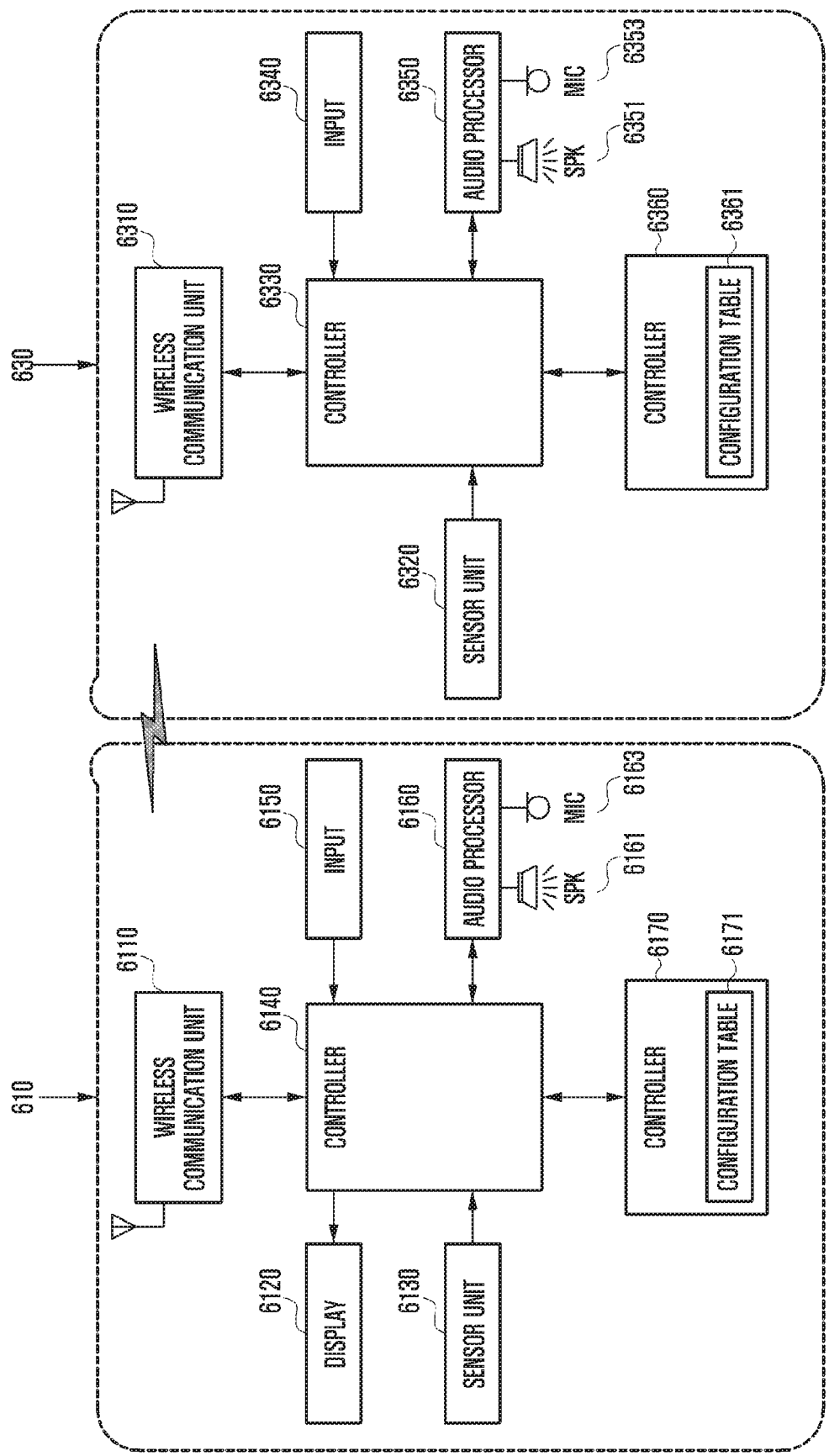
FIG. 6 is a diagram illustrating an electronic device and an external electronic device according to various embodiments of the present disclosure.

FIG. 6 illustrates an electronic device 630 and an external electronic device 610 according to various embodiments of the present disclosure.

According to various embodiments of the present disclosure, the electronic device 630 and the external electronic device 610 may include all or a part of the components of the electronic devices 101 and 201 illustrated in FIGS. 1 and 2.

According to one embodiment, the electronic device 630 (e.g., auditory device or the like) may communicate with the external electronic device 610 (e.g., mobile electronic device, cellular phone, tablet or the like). The electronic device 630 and the external electronic device 610 may be paired in a wireless manner (e.g., radio frequency (RF), near field magnetic induction (NFMI), Bluetooth (BT), audio over Bluetooth low energy (AoBLE) or the like). For example, if the external electronic device 610 connected to the electronic device 630 is a mobile terminal, the electronic device 630 may receive, from the mobile terminal, music playing, telephone reception, alarm, or sound information such as an input signal of a first microphone 6163 of the mobile terminal.

According to one embodiment, the electronic device 630 may use the external electronic device 610 to change a setting state of the electronic device 630. For example, the electronic device 630 may not include a separate display device and may include a limited input 6340 (e.g., button or the like). For example, the electronic device 630 may be a kind of hearing aids and may include setting of a plurality of filter modes (e.g., wide dynamic range compression (WDRC)), volumes, or the like. For example, when a user sets the mode or the volume through the input 6340 (for example, button, or the like) of the electronic device 630, it may be inconvenience to confirm the setting state or set the mode that the user wants. For example, when the electronic device 630 interworks with the external electronic device 610, the mode of the electronic device 630 may be easily set or changed using the external electronic device 610. For example, in the case of using the mobile terminal including various input devices (e.g., touch key, button or the like) and a display device, the mobile terminal may provide an UI that may control the electronic device 630 to the user and the user may use the provided UI to easily change the setting of the electronic device 630. For example, in the case of changing the volume of the electronic device 630, the user does not directly manipulate the electronic device 630 but provides a touch input to the mobile terminal, thereby controlling the volume of the electronic device 630.

According to one embodiment, the electronic device 630 may include a sensor unit 6320. The sensor unit 6320 may include a proximity sensor, an accelerator sensor, a geomagnetic sensor, a biometric sensor, or the like. The electronic device 630 may use the sensor unit 6320 to confirm whether the user wears the electronic device 630. According to one embodiment, the electronic device 630 may set a power control mode of the electronic device 630 depending on whether the user wears the electronic device 630. For example, if the electronic device 630 includes the accelerator sensor, the electronic device 630 may detect a user's movement using the accelerator sensor and may be operated in a sleep mode if a specific movement is not detected.

According to one embodiment, the electronic device 630 may be connected to the external electronic device 610 (e.g., mobile electronic devices (cellular phone, tablet or the like)) to definitely transmit a sound at a remote location to a user. The electronic device 630 may play a sound source stored in the external electronic device 610. The electronic device 630 may convert the received sound information into an audio file or a text file and store the converted file in the external electronic device 610. For example, if the signal of the first microphone 6163 of the external electronic device 610 is set in a remote microphone, the electronic device 630 may receive an audio signal of the first microphone 6163 of the external electronic device 610. For example, the audio signal received from the external electronic device 610 may be data compressed by a data compression operation. The external electronic device 610 may transmit data to the electronic device 630 through a wireless communication unit 6110 (e.g., antenna or the like). The electronic device 630 may receive data through the wireless communication unit 6310 (e.g., antenna or the like) and separate audio information included in a data format and output the separated audio information through a second speaker 6351 by an audio information release operation.

The electronic device 630 may receive and play an audio signal stored in the external electronic device 610. For example, the external electronic device 610 may store a plurality of alarm sounds. For example, the external electronic device 610 may transmit different alarm sounds to the auditory device depending on a user's situation, a system state, time, whether to receive a message, whether to receive an e-mail, or the like. The electronic device 630 separates the audio information included in the data format from the data transmitted from the external electronic device 610 and may play the separated audio information as the output of the second speaker 6351 by the audio information release operation.

The electronic device 630 may use the external electronic device 610 to record a signal. The electronic device 630 may compress and store audio data for the efficient use of the external electronic device 610. The external electronic device 610 may use a speech to text (STT) scheme to convert the audio signal into text information and store the text information. For example, the external electronic device 610 may use the STT scheme to store a conversation context through the electronic device 630 as a text. According to the embodiment of the present disclosure, the external electronic device 610 may add and store various types of information such as time information, sensor information, and location information when storing the conversation content as the text. The external electronic device 610 may display the stored conversation content on a display unit. According to one embodiment, the external electronic device may use the text to speech (TTS) scheme to change the text information to the audio signal and transmit the changed audio signal to the electronic device 630. The electronic device 630 may output the audio signal transmitted from the external electronic device 610 through the second speaker 6351.

The electronic device 630 may transmit the signal received through a second microphone 6353 to the external electronic device 610. The external electronic device 610 may store the signal transmitted from the electronic device 630. To decrease power consumed to transmit the signal, the electronic device 630 may perform data compression on the signal and transmit the compressed signal to the external electronic device 610. The electronic device 630 may include a codec that compresses audio data and decompresses the compressed audio data. The external electronic device 610 may receive the signal received from the electronic device 630 through the second microphone 6353 of the electronic device 630 and performs the STT conversion on the received signal to be stored as the text. The external electronic device 610 may output data received from the electronic device 630 or the stored data through a first speaker (SPK) 6161.

According to one embodiment, the electronic device 630 and the external electronic device 610 may use each of the audio processors 6160 and 6350 (e.g., the first microphone (MIC) 6163 and the first speaker 6161 of the external electronic device 610 and the second microphone 6353 and the second speaker 6351 of the electronic device 630) to provide a call function between remote locations to a user.

According to various embodiments of the present disclosure, the electronic device 630 may form a network with additional external electronic devices connected to the external electronic device 610. For example, the electronic device 630 may transmit and receive data to and from other electronic devices connected to the external electronic device 610 through the external electronic device 610.

According to various embodiments of the present disclosure, the electronic device 630 or the external electronic device 610 may include various electronic devices including a microphone or a speaker in addition to the portable terminal or the auditory device. For example, the electronic device 630 or the external electronic device 610 may include smart glasses including a plurality of microphones, a head mounted display (HMD), a robot or the like.

Figure 7:
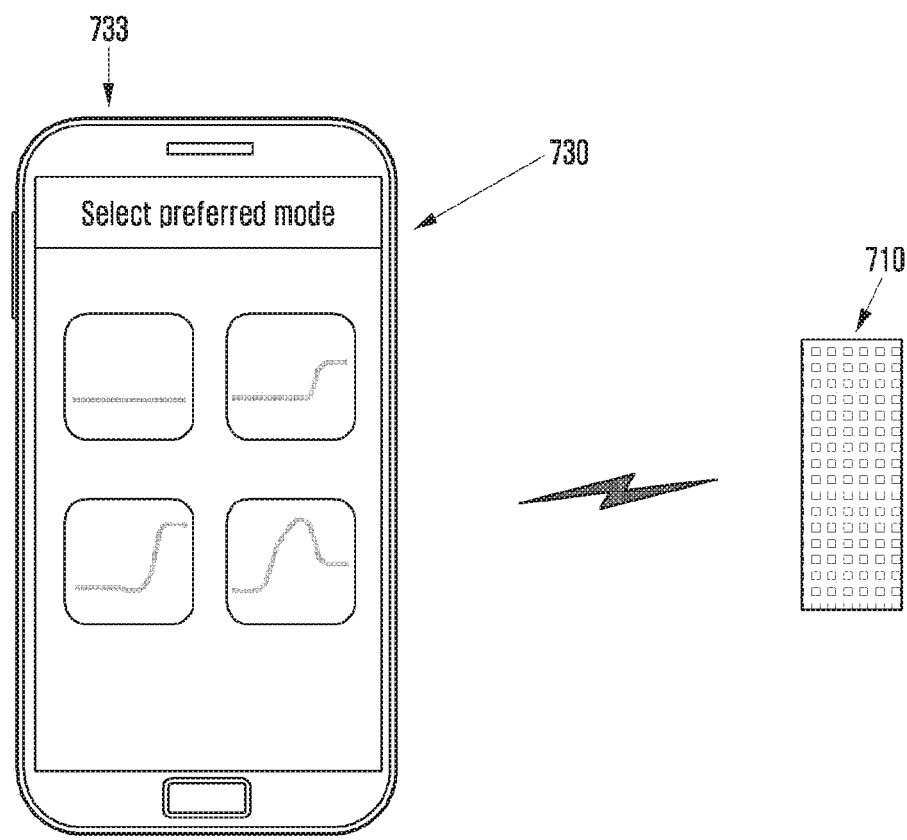
FIG. 7 is a diagram for describing an interworking operation of the electronic device with the external electronic devices according to various embodiments of the present disclosure.

FIG. 7 is a diagram for describing an interworking operation of an electronic device 710 with an external electronic device 730 according to various embodiments of the present disclosure.

The electronic device 710 may receive outside sounds through a microphone. The electronic device 710 may control or change setting of the electronic device 710 by communication with the external electronic device 730. For example, the external electronic device 730 may include a setting application of the electronic device 710. For example, the external electronic device 730 may perform a mode control, a volume control or the like of the electronic device 710 on the basis of the setting application of the electronic device 710. The external electronic device 730 may display a mode that may be set by the electronic device 710 through the display. The external electronic device 730 may change the volume or the mode of the electronic device 710 depending on the input received from the user through the input (e.g., touch screen). According to one embodiment, the external electronic device 730 may set the mode of the electronic device 710 by various sensors (e.g., accelerator sensor, gyro sensor, biometric sensor, proximity sensor or the like) included in the sensor unit. For example, if the user shakes the external electronic device 730 laterally or vertically, the external electronic device 730 may detect the shaking using the sensor unit. If sensing the movement, the external electronic device 730 may transmit the input signal corresponding to the movement to the electronic device 710, and thus control the electronic device 710 to change a mode. As another example, the external electronic device 730 may use the biometric sensor (e.g., fingerprint sensor) to control the electronic device 710 to change the mode to the setting state corresponding to the biometric information of the user.

Figure 8:
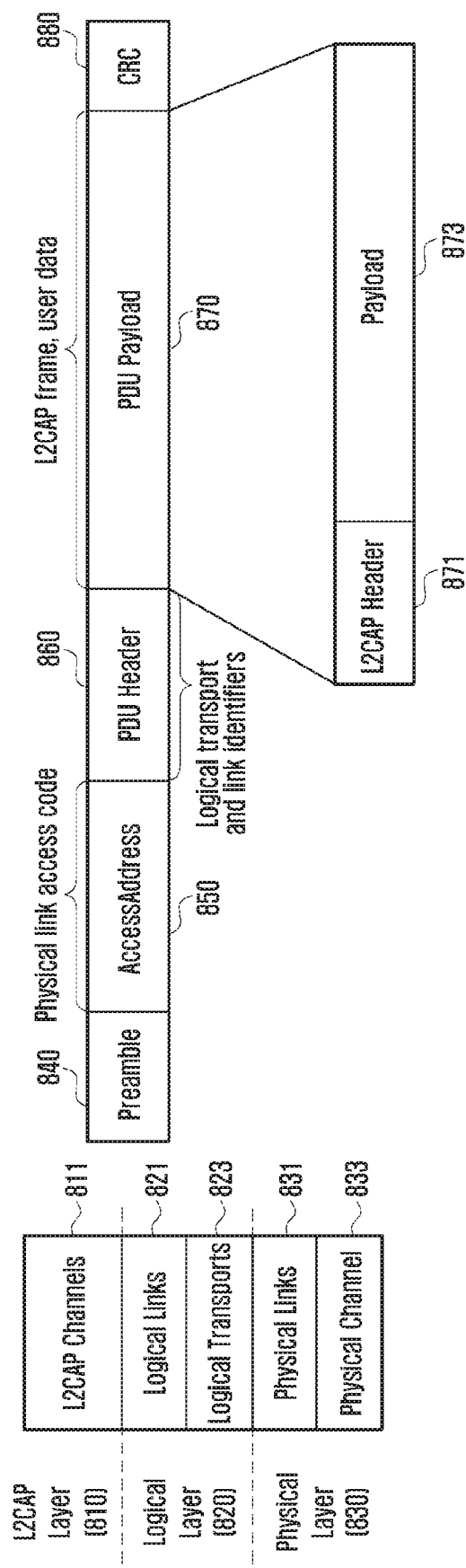
FIG. 8 is a diagram illustrating a data format used in the electronic device or the external electronic devices according to various embodiments of the present disclosure.

FIG. 8 illustrates a data format used in the electronic device 201 or the external electronic device according to various embodiments of the present disclosure.

According to one embodiment, the electronic device 201 (e.g., auditory device) and the external electronic device may perform communication using the data format illustrated in FIG. 8. For example, the electronic device 201 and the external electronic device may wirelessly communicate with each other. For example, the electronic device 201 and the external electronic device may use a Bluetooth low energy (BLE) format as the data format when they wirelessly communicate with each other. For example, the electronic device 202 and the external electronic device may modify a part of the BLE format when they communicate with each other to use an audio over BLE (AoBLE) format that may exchange the audio signal.

According to one embodiment, the electronic device 201 or the external electronic device may include a logical link control and adaptation protocol (L2CAP) layer 810, a logical layer 820, and a physical layer 830. The L2CAP layer may include an L2CAP channel. The logical layer may include a logical link 821 and a logical transport 823. The physical layer may include a physical link 831 and a physical channel 833.

According to the embodiment, the data format may include a preamble 840, an access address 850, a protocol data unit playload (PDU) header 860, a PDU payload 870, and a cyclic redundancy check (CRC) 880.

According to the embodiment, the access address 850 may include a physical link access code. The PDU header 860 may include an identifier of the logical transport and the link. The PDU payload 870 may include an L2CAP frame and a user data. According to the embodiment, the PDU payload 870 may include an L2CAP header 871 and a payload 873.

According to the embodiment, the electronic device 201 and the external electronic device may exchange voice data, a sampling rate of an audio processor (e.g., codec), a frame size, setting data on whether activation is made, or the like with each other while carrying them on the PDU payload 870. According to the embodiment, the L2CAP header unit of the transmission data format may include an operation (OP) code that divides a kind of data.

Figure 9:
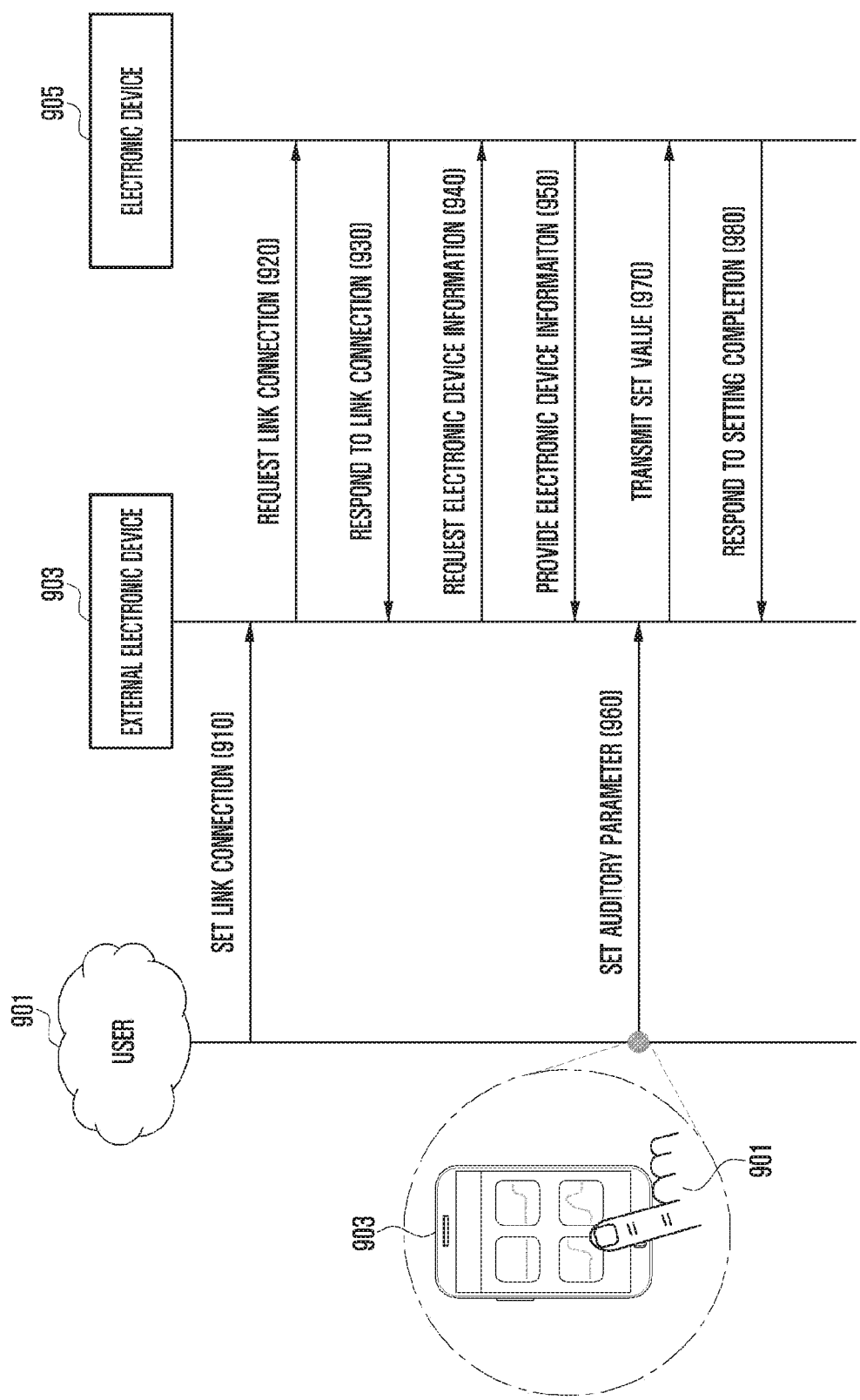
FIG. 9 is a diagram illustrating a signal flow between the electronic device and the external electronic devices according to various embodiments of the present disclosure.

FIG. 9 is a diagram illustrating a signal flow between an electronic device 905 and an external electronic device 903 according to various embodiments of the present disclosure.

According to the embodiment, the electronic device 905 (e.g., auditory device) may communicate with the external electronic device 903 (e.g., portable terminal, or the like). The electronic device 905 may use the external electronic device 903 to change the setting.

In operation 910, the electronic device 903 may receive an input (e.g., link connection setting) for communication with the electronic device 905 from a user 901. For example, the external electronic device 903 may display the connectable electronic device 905 or other devices on the display. If receiving an input for selecting the electronic device 905 or other devices from the user 901, the external electronic device 903 may try the communication with the selected electronic device 905 or other devices.

In operation 920, the external electronic device 903 may transmit a link connection request to the electronic device 905. For example, the external electronic device 903 may transmit the link connection request to the electronic device 905 selected depending on the input of the user 901.

In operation 930, the electronic device 905 may transmit a link connection response to the external electronic device 903 in response to the link connection request of the external electronic device 930. According to the embodiment, if the external electronic device 903 is linked with the electronic device 905, the external electronic device 903 may display a user interface notifying that the link is connected.

In operation 940, the external electronic device 903 may request information to the electronic device 905. For example, the external electronic device 903 may request the electronic device 905 for setting characteristics. For example, the external electronic device 903 may request mode information, function information, setting information, or the like of the electronic device 905.

In operation 950, the electronic device 905 may transmit information to the external electronic device 903. For example, the electronic device 905 may respond to the information request of the external electronic device 903 to transmit the setting information corresponding to the information request to the external electronic device 903.

In operation 906, the external electronic device 903 may receive auditory parameter setting from the user. According to the embodiment, the external electronic device 903 may display the mode information or at least one of the settable auditory parameters of the electronic device 905. For example, the external electronic device 903 may display the setting data or the settable auditory parameter information of the electronic device 905 based on the information received from the electronic device 905. The external electronic device 903 may receive, from the use 901, the displayed mode of the electronic device 905, at least one mode of the auditory parameters of the user 901, or an input for selecting the auditory parameters.

In operation 970, the external electronic device 903 may transmit the mode or auditory parameters selected depending on the input of the user 901 to the electronic device 905. For example, the external electronic device 903 may transmit a specific mode setting value of the electronic device 905, which is selected depending on the input of the user 901, to the electronic device 905.

In operation 980, a setting completion response may be transmitted to the external electronic device 903. According to the embodiment, the electronic device 905 may update filter information of the audio processor (e.g., codec) based on the auditory parameter or the mode setting value received from the external electronic device 903. For example, the electronic device 905 may change directivity receiving a sound from the outside, a filter value for filtering the received sound information, a cut-off frequency band (or pass frequency band), or the like depending on the auditory parameter or mode setting value received. The electronic device 905 may change the setting depending on the received setting value and then transmit the setting completion response to the external electronic device 903.

According to the embodiment, the electronic device 905 may process the sound information received from the outside based on the set mode or auditory parameter and output the processed sound information through the speaker (or receiver).

Figure 10:
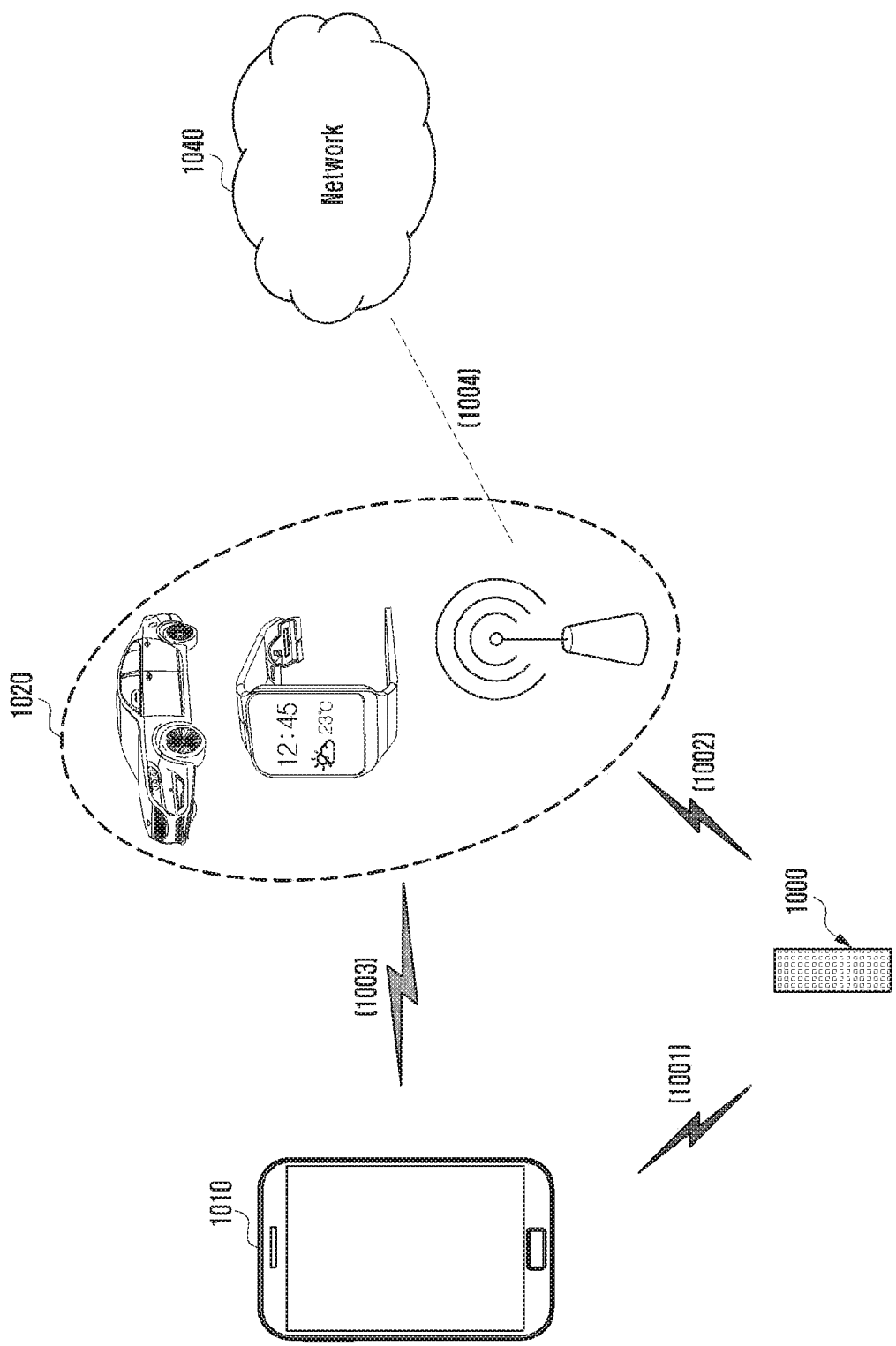
FIG. 10 is a diagram for describing a situation in which the electronic device and a plurality of external electronic devices according to various embodiments of the present disclosure communicate with each other.

FIG. 10 is a diagram for describing a situation in which an electronic device 1000 and a plurality of external electronic devices 1010 and 1020 according to various embodiments of the present disclosure communicate with each other.

According to the embodiment, the electronic device 1000 may communicate with the plurality of external electronic devices (e.g., first external electronic device 1010 and second external electronic device 1020) or a network 1040.

For example, the electronic device 1000 may connect the first external electronic device 1010 to first communication 1001. The electronic device 1000 may exchange data with the first external electronic device 1010. For example, the electronic device 1000 may set audio filter information of the electronic device 1000 using the first external electronic device 1010. For example, the electronic device 1000 may receive commands or data for setting the audio filter information from the first external electronic device 1010.

The electronic device 1000 may be connected to the second external electronic device 1020 or the network 1040 through the first external electronic device 1010 to perform data communication with the first external electronic device 1010, the second external electronic device 1020, or the network 1040. For example, the first external electronic device 1010 may connect third communication 1003 to the second external electronic device 1020. The second external electronic device 1020 may connect the network 1040 to fourth communication 1004. For example, the electronic device 1000 may use the first external electronic device 1010 as a relay terminal to transmit and receive data to and from the second external electronic device 1020 or the network 1040. According to the embodiment, the electronic device 1000 may use a communication protocol provided to the first external electronic device 1010 to exchange data to and from the second external electronic device 1020 or the network 1040. For example, the electronic device 1000 may connect the first external electronic device 1010 to the first communication 1001 through NFMI or BLE. The first external electronic device 1010 may connect the third communication 1003 to the second external electronic device 1020 or the network 1040 (including the connection through a gateway) through the WiFi. The electronic device 1000 may transmit and receive data to and from the first external electronic device 1010 through the NFMI or the BLE, and the first external electronic device 1010 may transmit and receive data received from the electronic device 1000 to and from the second external electronic device 1020 or the network 1040 through the WiFi. For example, the electronic device 1000 may download fitting (audio filter) data from the network 1040 through the first external electronic device 1010. As another example, the electronic device 1000 may receive and output the audio data information stored in the second external electronic device 1020 through the first external electronic device 1010.

The electronic device 1000 may connect the second communication 1002 to the second external electronic device 1020. The electronic device 1000 may support a protocol that may perform the communication with the second external electronic device 1020 or the network 1040. For example, the electronic device 1000 may provide a protocol (e.g., 3G, LTE) for telephone communication. The electronic device 1000 may communicate with a base station to provide a call function to a user.

An electronic device according to various embodiments of the present disclosure may include: a housing including a portion configured to be attached to/detached from a part of the user's ear; at least one microphone included in the housing and configured to receive a sound from the outside and to detect a direction in which the sound is received; at least one speaker included in the housing; at least one communication circuit included in the housing; a processor included in the housing and electrically connected to the at least one microphone, the at least one speaker, and the at least one communication circuit; and at least one memory included in the housing and electrically connected to the processor.

The memory may store instructions that, when executed, cause the processor to store data regarding a sound, which has been received through the microphone, in the memory at least temporarily, to output a sound, which corresponds to a sound received from a first direction among the data, through the speaker, and to output a sound, which corresponds to a sound received from a second direction among the data, through the speaker based at least in part on information regarding the state of the electronic device or information acquired from the outside of the electronic device.

The information regarding the state of the electronic device may include at least one of a moving speed of the electronic device, a sound received by the electronic device, a movement of the electronic device, and a position of the electronic device. The information acquired from the outside may include information of the external electronic device connected to the electronic device.

The instructions cause the processor to determine whether the user gets into the vehicle based at least in part on information regarding the state of the electronic device and/or information acquired from the outside of the electronic device, and output the sound corresponding to the sound received from the second direction among the data through the speaker if it is determined that the user gets into the vehicle. The instructions cause the processor to determine that the user of the electronic device gets into the vehicle if the electronic device receives a predetermined type of sound.

The instructions cause the processor to determine that the user of the electronic device gets into the vehicle if the electronic device continuously detects vibrations beyond a predetermined strength for a predetermined time.

The instructions cause the processor to determine that the user of the electronic device gets into the vehicle if the moving speed of the electronic device is equal to or higher than the predetermined speed.

The instructions cause the processor to adjust filter characteristics of the electronic device if it is determined that the user gets into the vehicle. The instructions cause the processor to adjust the auditory parameters of the electronic device if it is determined that the user gets into the vehicle.

According to one embodiment, the instructions cause the processor to acquire the information of the external electronic device from an external electronic device, confirm the type of the external electronic devices based at least in part on the acquired information, and output, through the speaker, the sound corresponding to the sound received from the second direction among the data based on the identified type of the external electronic devices.

An electronic device according to various embodiments of the present disclosure may include: a housing including a portion configured to be attached to/detached from a part of the user's ear; at least one microphone included in the housing and configured to receive a sound from the outside and to detect a direction in which the sound is received; at least one speaker included in the housing; at least one communication circuit included in the housing; a processor included in the housing and electrically connected to the at least one microphone, the at least one speaker, and the at least one communication circuit; and at least one memory included in the housing and electrically connected to the processor.

The memory may store instructions that, when executed, cause the processor to at least store data regarding a sound, which has been received through the microphone, in the memory and to output a sound in a specific direction of data regarding the source through the speaker based at least in part on the information regarding the state of the electronic device and/or the information acquired from the outside of the electronic device.

According to one embodiment, the instructions may cause the processor to perform communication with the external electronic device, confirm the kind of the communicating external electronic device, and output the sound corresponding to the sound received from the specific direction among the data regarding the sound through the speaker.

Figure 11:
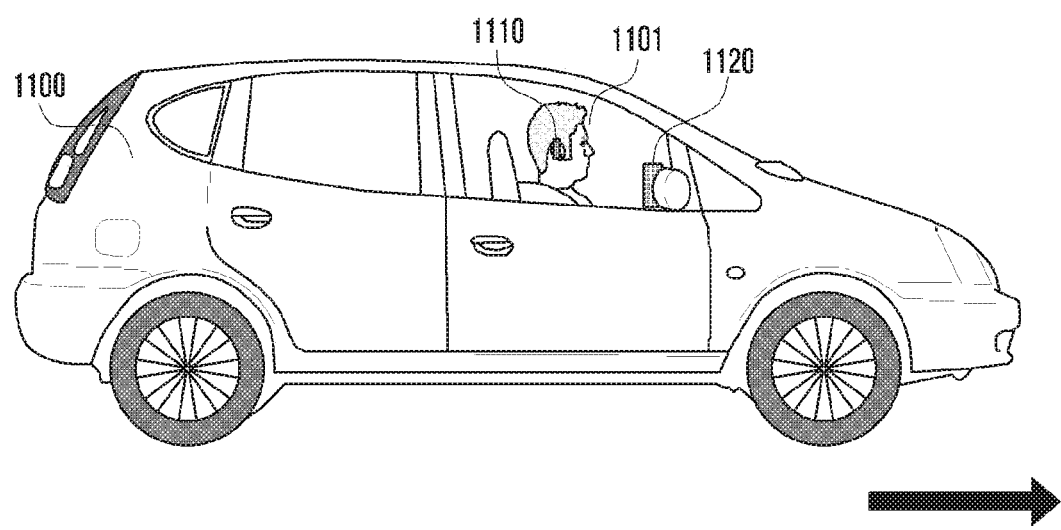
FIG. 11 is a diagram for describing the operation of the electronic device in a vehicle according to one embodiment of the present disclosure.

FIG. 11 is a diagram for describing the operation of the electronic device in the vehicle according to one embodiment of the present disclosure.

The electronic device 1110 may include a car mode. The car may include an electronic device 1120 (e.g., car kit, navigation, mobile electronic device or the like) for a vehicle. The electronic device 1110 may communicate with the external electronic device 1120 that is included in a car 1100. If being connected to the external electronic device 1120 for the vehicle, the electronic device 1110 may execute the car mode. According to one embodiment, the electronic device 1110 may execute the car mode if the first external electronic device (e.g., portable terminal), to which the electronic device 1110 is connected, is connected to the second external electronic device 1120 (e.g., car kit or the like) included in the car 1100. For example, if the first external electronic device (e.g., portable phone or the like) connected to the electronic device 1110 (e.g., hearing aids) is connected to the second external electronic device 1120 (e.g., navigation or the like of the car 1100), the electronic device 1110 may determine that a user 1101 is driving a vehicle to automatically switch a mode to the car mode.

For example, when the car 1100 includes an Internet of Things (IOT) device, the electronic device 1110 recognizes the IOT device or the mobile electronic device capable of controlling the electronic device 1110 recognizes the IOT device, the electronic device 1110 may determine that the user 1101 gets into the car 1100 to automatically switch the operation mode to the car mode. According to one embodiment, if the first external electronic device (e.g., portable terminal or the like) connected to the electronic device 1110 is itself switched to the car mode or the second external electronic device 1120 (e.g., electronic device (e.g., navigation or the like) for the vehicle) is operated, the electronic device 1110 may determine that the user 1101 is driving the vehicle to automatically switch the operation mode to the car mode.

For example, if the first external electronic device (e.g., portable terminal) connected to the electronic device 1110 is connected to the second external electronic device 1120 (e.g., electronic device for the vehicle), the first external electronic device may transmit information indicating that the second external electronic device (e.g., electronic device for the vehicle) 1120. The electronic device 1110 may confirm that the first external electronic device is connected to the second external electronic device 1120 based on the information received from the first external electronic device and may switch the operation mode to the car mode.

According to one embodiment, the electronic device 1110 itself may switch the operation mode to the car mode. For example, the electronic device 1110 may determine whether the user 1101 gets into the vehicle 1100 using the sensor unit. For example, if the moving speed of the electronic device 1110 becomes equal to or higher than a predetermined speed using the sensor unit (e.g., acceleration sensor), the electronic device 1110 may determine that the user 1101 gets into the vehicle 1100 to switch the operation mode to the car mode.

According to one embodiment, if the electronic device 1110 uses the sensor unit to detect that vibrations beyond a certain level are continuously generated, the electronic device 1110 may switch the operation mode to the car mode.

According to one embodiment, if the electronic device 1110 recognizes that a sound corresponding to an engine sound of the car 1100 is input for a predetermined period of time or longer through the audio (e.g., microphone), the electronic device 1110 may switch the operation mode to the car mode.

According to various embodiments of the present disclosure, if the electronic device 1110 determines that the user 1101 gets into the car 1100, the settings, the functions, the auditory parameters, the filter values, the directivity or the like of the electronic device 1110 may be differently controlled without switching the mode. For example, the switching to the car mode may not be the switching of the electronic device 1110 to the separate operation mode, but may be the change of the set values for performing the function of the electronic device 1110 in the same operation mode.

Figure 12:
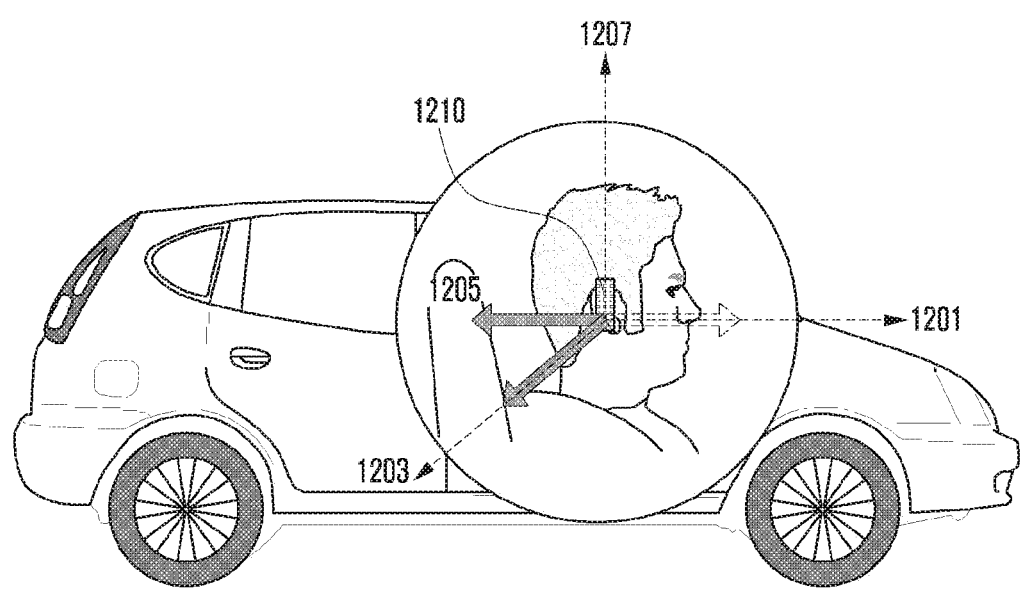
FIG. 12 is a diagram for describing the operation of the electronic device in a vehicle according to one embodiment of the present disclosure.

FIG. 12 is a diagram for describing the operation of the electronic device in the vehicle according to one embodiment of the present disclosure.

According to one embodiment, an electronic device 1210 may provide a directional control so that a user may better hear a sound in a specific direction. For example, the electronic device 1210 may perform a directivity control on at least one direction of a forward direction 1201, a lateral direction 1203, and a backward direction 1205 with respect to an up direction 1207 which is vertical to a ground or a direction in at least a predetermined range. As another example, the electronic device 1210 may measure the direction of sound received within a predetermined range with respect to the up direction 1207 as well as the forward direction 1201, the lateral direction 1203, and the backward direction 1205 and control the directivity. According to one embodiment, the electronic device 1210 may include a plurality of microphones. The electronic device 1210 may analyze an input time difference of the sound received through the plurality of microphones and confirm the direction of the sound. According to one embodiment, the electronic device 1210 may be generally oriented towards the front 1201 of the user so that the user can hear the sound of the forward direction 1201 well. The electronic device 1210 may control the directivity if the electronic device 1210 is switched to the car mode (e.g., if it is determined that the user gets into the vehicle) to change the directivity to the lateral direction 1203 or the backward direction 1205 of the user. For example, if the user is driving the vehicle, the user may better hear the sound (e.g., voice of passengers of a passenger seat or the like) in the lateral direction 1203 or the sound (e.g., sound from a speaker at the rear of the vehicle or the like) in the backward direction 1205 than the sound in the forward direction. As another example, if the operation mode is switched to the car mode, the electronic device 1210 may change the directivity of the electronic device 1210 from the forward direction 1201 to the lateral direction 1203 or the backward direction 1205. For example, in the case of the electronic device 1210 (e.g., auditory device (e.g., hearing aids)), in the car mode, the directivity of the microphone which is set as the forward direction 1201 may be changed to the lateral direction 1203 or the backward direction 1205 (i.e., passenger seat or back seat direction). As another example, the electronic device 1210 may change the directivity of the electronic device 1210 to non-directivity in the car mode to provide the sound information acquired from all the directions 1201, 1203, 1205, and 1207 to the user.

According to one embodiment, the electronic device 1210 may operatively change the directivity of the electronic device 1210 according to the speed of the electronic device 1210. For example, if the user gets into a vehicle, the surrounding noise may be generated more or louder depending on the speed of the vehicle. For example, the electronic device 1210 may change the directivity to the forward direction 1201, omnidirectivity (or all directions), the lateral direction 1203, and the backward direction 1205 as the moving speed increases.

According to various embodiments of the present disclosure, the electronic device may set the directivity as any direction such as the side and forward directions and the side and backward directions with respect to the user as well as the forward direction 1201, the lateral direction 1203, the backward direction 1205, or the omni-directional direction. The directivity set by the electronic device is not limited thereto, and may be set in any at least one direction based on the use.

Figure 13:
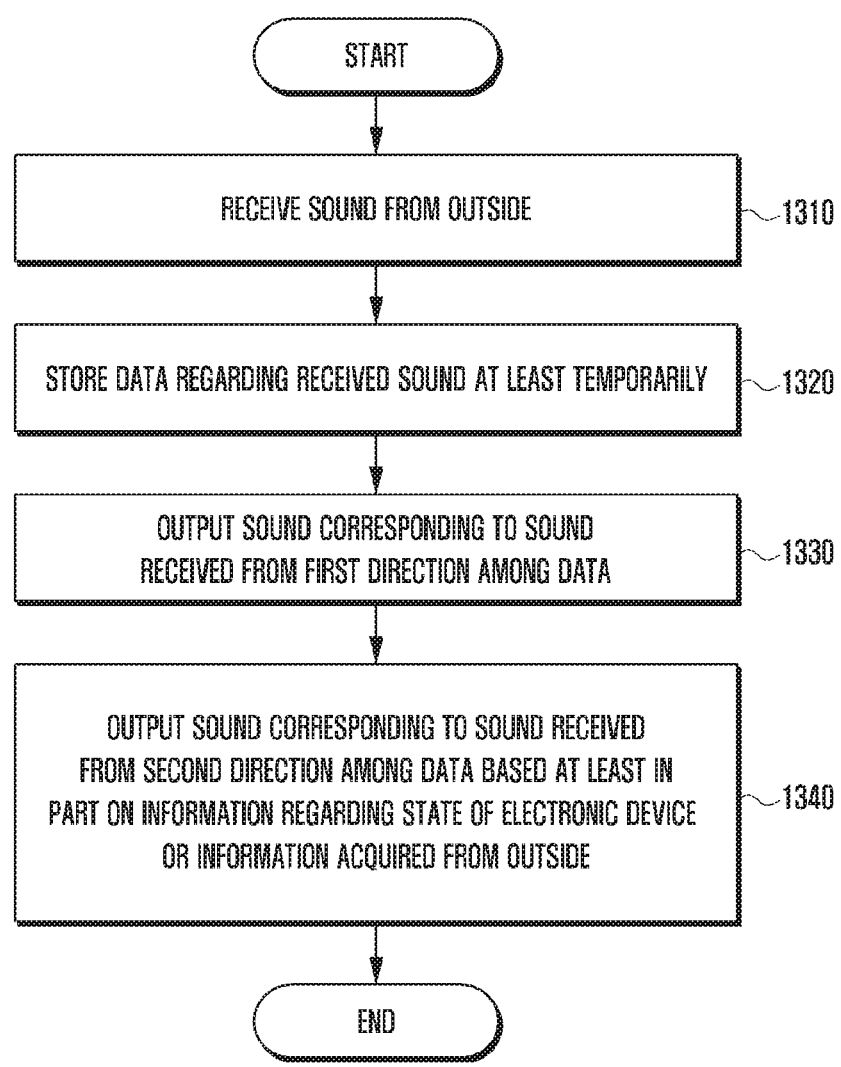
FIG. 13 is a flow chart of a method for controlling an operation of an electronic device according to an embodiment of the present disclosure.

FIG. 13 is a flow chart of the method for controlling an operation of an electronic device according to the embodiment of the present disclosure.

According to one embodiment, in operation 1310, the electronic device may receive a sound from the outside. For example, the electronic device may include at least one microphone. The electronic device may receive a sound from outside using the microphone, and determine the direction in which the sound is received.

According to one embodiment, in operation 1320, the electronic device may at least temporarily store data regarding the received sound. For example, the electronic device may convert (e.g., conversion into a digital signal), compress, modulate, and store the received sound. For example, the electronic device may store the data regarding the received sound and the information regarding the direction in which the sound was received.

According to one embodiment, in operation 1330, the electronic device may output a sound corresponding to the sound received from the first direction among the data regarding the sound. For example, the electronic device may extract only the data corresponding to the sound received from the front of the user. The electronic device can output the sound corresponding to the extracted data as the sound extracted through the speaker. For example, the electronic device may output the sound corresponding to the sound received from the front of the user among the data regarding the data of the acquired sound.

According to one embodiment, in 1340 operation, the electronic device may generate a sound corresponding to a sound received from a second direction among the data regarding the sound, based at least in part on information regarding the state of the electronic device or the information acquired from the outside. For example, the electronic device may determine whether the user gets into the vehicle based at least in part on the information regarding the state of the electronic device or the information acquired from the outside. For example, the electronic device may recognize that the user of the electronic device gets into the vehicle by sensing that the moving speed is equal to or higher than the predetermined value by using the sensor of the electronic device. For example, the electronic device may recognize that the user of the electronic device gets into the vehicle based on the information received from the external electronic device (e.g., car navigation system, car kit or the like) connected in the communication with the electronic device. According to one embodiment, the electronic device may control the directivity of the electronic device if recognizing that the user gets into the vehicle (i.e., the inside of the vehicle). For example, the electronic device may change the directivity of the electronic device from the forward direction of the user to the lateral or backward direction. For example, the electronic device may output the sound corresponding to the sound received from the front of the user among the data regarding the data of the acquired sound before it is recognized that the user gets into the vehicle. According to one embodiment, after recognizing the boarding of the user, the electronic device may output the sound corresponding to the sound received from the lateral or backward direction from among the data regarding the acquired sound.

Figure 14:
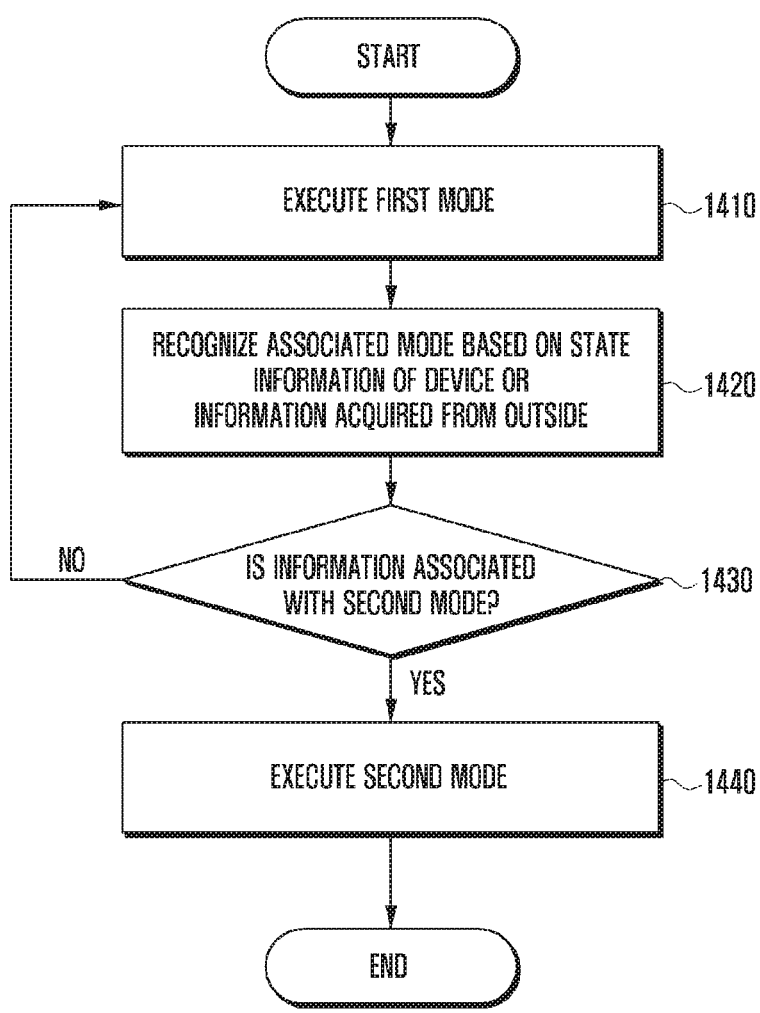
FIG. 14 is a flow chart of the method for controlling an operation of an electronic device according to the embodiment of the present disclosure.

FIG. 14 is a flow chart of the method for controlling an operation of an electronic device according to the embodiment of the present disclosure.

According to one embodiment, in operation 1410, the electronic device may execute a first mode. For example, the electronic device may be operated in a normal mode of amplifying and outputting the received outside sound. For example, the electronic device may be oriented forward to amplify and output the sound in the forward direction of the user in the normal mode.

According to one embodiment, in operation 1420, the electronic device may recognize the associated mode based on state information of the electronic device or information acquired from the outside. For example, the state information of the electronic device may be the information acquired using the microphone or the sensor (e.g., acceleration sensor or the like) of the electronic device. For example, the state information of the electronic device may include the information regarding the moving speed, the acceleration, the position, the movement, and the received sound of the electronic device. According to one embodiment, the electronic device may receive the information from the external device. For example, the electronic device may receive the information of the external device from the communicating external device. For example, the electronic device may receive information regarding the name, the kind, the support function or the like of the communicating external device.

According to one embodiment, the electronic device may recognize the associated mode based on the state information or the information acquired from the outside. For example, the electronic device may determine whether the acquired information is information associated with the first mode currently being executed or information associated with the second mode different from the first mode.

According to one embodiment, the electronic device may determine whether the associated mode based on the state information or the information acquired from the outside is the information associated with the car mode. For example, the electronic device may determine whether the user gets into the vehicle based on the acquired information. According to one embodiment, the electronic device may determine whether the user gets into the vehicle based on the state information of the electronic device. According to one embodiment, the electronic device may determine whether the electronic device is within the vehicle based on the moving speed, the acceleration, the position, the movement, and the received sound of the electronic device. For example, if the electronic device may be configured so that when the moving speed of the electronic device is equal to or higher than a predetermined speed, the position of the electronic device is detected to be inside the vehicle, or the electronic device receives the engine sound of the car, it may be recognized that the electronic device is in the vehicle. The electronic device may recognize that the state information of the electronic device is the information associated with the car mode.

According to one embodiment, the electronic device may communicate with the external electronic device to receive device information from the communicating external electronic device. The electronic device may determine that the electronic device is in the vehicle if the communicating external electronic device is the electronic device included in the vehicle, based on the device information of the external electronic device. According to one embodiment, the electronic device may determine that the electronic device is in the vehicle based on the connected mobile electronic device. For example, the electronic device may receive environmental information from the communicating mobile electronic device. The electronic device may determine whether the electronic device is currently in the vehicle based on the information received from the mobile electronic device. According to one embodiment, if the electronic device detects that the moving speed is equal to or higher than a predetermined speed, the electronic device may determine that a user gets into the vehicle. The electronic device may recognize that the information received from the outside is information associated with a second mode (e.g., car mode). According to one embodiment, in operation 1430, the electronic device may determine whether the state information of the electronic device or the information acquired from the outside is associated with the second mode. According to one embodiment, the electronic device may perform operation 1440 if the acquired information is associated with the second mode. The electronic device may maintain the operation of the first mode in operation 1410 if the acquired information is not associated with the second mode.

For example, while the electronic device is operated in the normal mode, if the electronic device may determine whether the state information or the information received from the outside is associated with the car mode, and if it is determined that the state information or the information received from the outside is associated with the car mode, the electronic device perform operation 1440 and if the state information or the information received from the outside is not associated with the car mode, the electronic device may perform operation 1410.

According to one embodiment, in operation 1440, the electronic device may execute the second mode. For example, the electronic device may change the directivity, the sound amplification value, the parameter value, the filter value, and the like of the electronic device to values corresponding to the second mode. For example, the electronic device may identify currently configuration information (e.g., directivity, noise attenuation amount, filter value, auditory parameter, etc.). The electronic device may change the confirmed configuration information to the values corresponding to the second mode.

According to one embodiment, if the state information of the electronic device or the information acquired from the outside is associated with the car mode, the electronic device may perform the car mode. For example, the electronic device may change the directivity from the forward direction to the lateral direction or the backward direction in the car mode. The electronic device may adjust the noise attenuation setting (e.g., noise attenuation amount) for removing noise. For example, the electronic device may remove noise such as engine noise that may occur inside the vehicle. For example, the electronic device may adjust a filtering value to a frequency band for removing noise according to a noise characteristic value of the engine sound or the like. According to one embodiment, the electronic device may dynamically adjust the noise attenuation amount according to the moving speed (i.e., the moving speed of the electronic device) of the vehicle.

Figure 15:
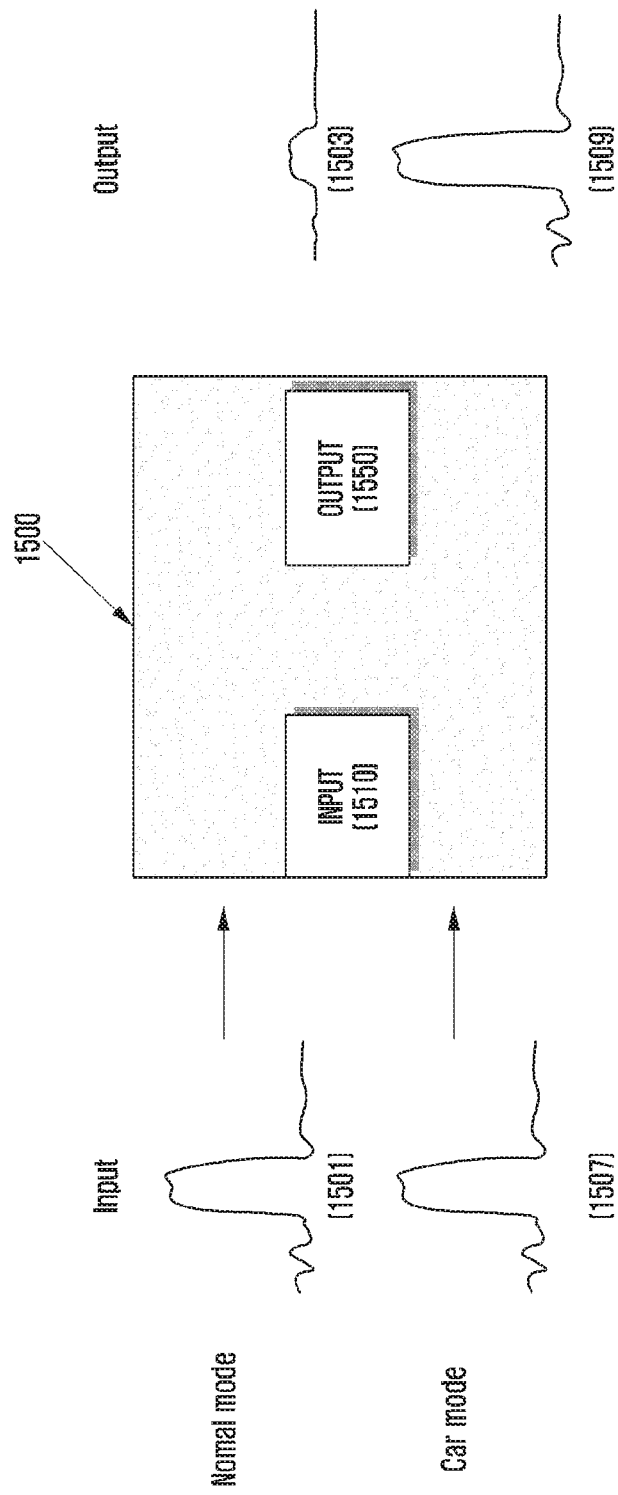
FIG. 15 is a diagram for describing a filtering function of the electronic device according to the embodiment of the present disclosure.

FIG. 15 is a diagram for describing a filtering function of an electronic device 100 according to the embodiment of the present disclosure. According to various embodiments of the present disclosure, an electronic device 1500 may be the electronic device 100 of FIG. 1.

According to one embodiment, the electronic device 1500 may change the filtering value for a pulse input in the car mode. For example, the electronic device 1500 may analyze a level, a time, and a frequency of a signal input through the input 1510 so that the user can better hear sounds of other people's speech, music, and the like. According to one embodiment, the electronic device 1500 may process the input signal according to the analysis result and output the processed input signal through the output 1550. For example, the electronic device 1500 may set the auditory parameters so that a sound (e.g., single-shot pulse input such as a horn sound or a batter sound) determined as noise is removed. According to one embodiment, the electronic device 1500 may remove and output sounds that are determined to be the noise among the received sounds in the normal mode.

According to one embodiment, unlike the general case, if the user is being driven, the sounds determined as noise may be sounds associated with the safety of the user. For example, the electronic device 1500 needs to notify the driving user of a crash sound, a horn, a traveling sound of an external vehicle or the like which may occur while the user is driving the vehicle. According to one embodiment, the electronic device 1500 may adjust the auditory parameter in the car mode. For example, the electronic device 1500 may not filter out the sounds required by the user during the driving by correcting the filter values. For example, the electronic device 100 may output a sound, which is determined to be noise and removed when the user does not drive the vehicle, and removed, without removing the sound while the user is driving the vehicle. For example, the electronic device 100 may adjust a pass band of a frequency band filter.

For example, if it is assumed that a signal for noise (e.g., horn sound) determined as noise is input to the electronic device 1500, the input signal 1501 is filtered in the normal mode to output the signal 1503 without the sound determined as the noise. It is possible to output a signal 1509 corresponding to the input signal without performing the filtering on the input signal 1507 in the car mode.

According to various embodiments of the present disclosure, the electronic device 1500 may change the filter characteristics based at least in part on the information regarding the state of the electronic device 1500 and/or the information acquired from the outside. For example, the electronic device 1500 may change the operation mode or the setting based on the user input, the information regarding the state or the movement of the electronic device 1500 acquired through the sensor, and the information (e.g., information regarding the kind of external electronic devices, or the like) received from the external electronic device. If the operation mode is changed, the electronic device 1500 may adjust the filter characteristics according to the changed operation mode. According to one embodiment, the electronic device 1500 may store data regarding the sound acquired from the outside in a memory, and extract and output the sound corresponding to the specific direction among the data according to the change of the operation mode. According to one embodiment, the electronic device 1500 may output the sound corresponding to the specific direction according to the filter characteristics adjusted according to the operation mode. For example, the electronic device 1500 may adjust the filter characteristics according to the change (e.g., change from the normal mode to the car mode) of the operation mode to output the sound, which is determined to be noise in the normal mode and removed, in the normal mode, and output only the sound acquired from the forward direction of the user in the normal mode and then output even the sounds received from the lateral direction and the backward direction of the user in the car mode. According to various embodiments, the electronic device 1500 may change the directivity of the electronic device 1500 to adjust the filter characteristics as the operation mode is changed and output the sound in the specific direction.

Figure 16:
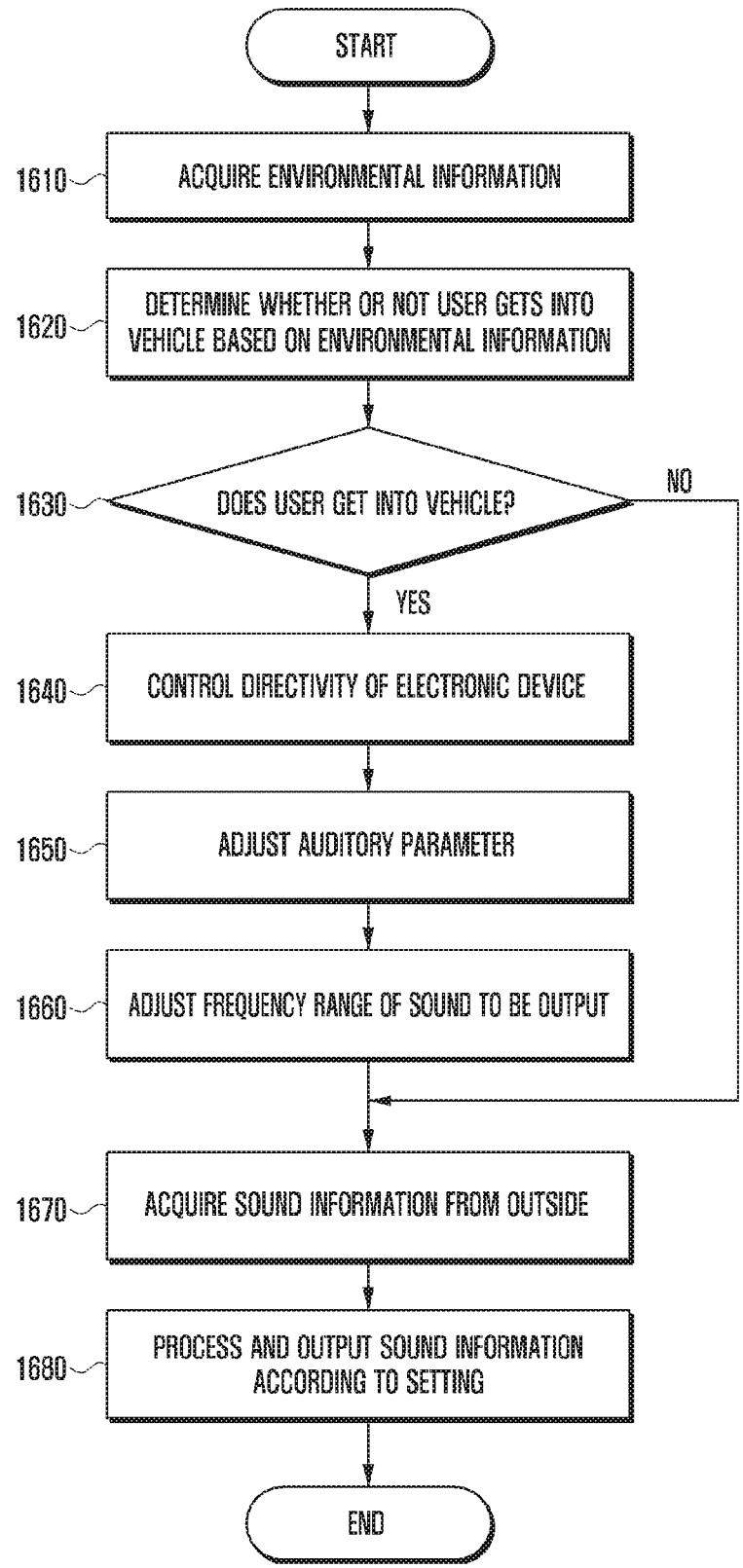
FIG. 16 is a flow chart of the method for controlling an operation of an electronic device according to the embodiment of the present disclosure.

FIG. 16 is a flow chart of the method for controlling an operation of an electronic device according to the embodiment of the present disclosure.

According to one embodiment, in operation 1610, the electronic device may acquire the surrounding environment information. For example, the environmental information may include at least one of the information of the external electronic device connected to the electronic device, the moving speed of the electronic device, the sound received by the electronic device, the movement of the electronic device, and the position of the electronic device.

For example, the electronic device may detect the moving speed, the movement, or the position of the electronic device through the sensor unit. The electronic device may receive the surrounding sound as the input signal.

According to one embodiment, the electronic device may establish the communication connection with the external electronic devices. For example, the electronic device may receive the communication connection request from the external electronic device. The electronic device may establish the communication connection with the external electronic device in response to the communication connection request received from the external electronic device. The electronic device may be connected to the external electronic device in a wired or wireless manner. The electronic device may receive the environmental information (e.g., information of the connected electronic device or the like) from the communicating external electronic device.

According to one embodiment, in operation 1620, the electronic device may determine whether the user gets into the vehicle based on the environmental information. The electronic device may determine if the electronic device is in the vehicle. According to one embodiment, if the moving speed of the electronic device is equal to or higher than the predetermined speed, the electronic device may determine that the user gets into the vehicle. For example, the electronic device may determine that the electronic device is in the vehicle if the moving speed is equal to or higher than a predetermined speed value based on a sensor (e.g., acceleration sensor, GPS or the like) included in the sensor unit.

According to one embodiment, if the electronic device receives a predetermined type of sound, it may determine that the electronic device is in the vehicle. For example, if the electronic device analyzes the received sound to determine that the received sound is an engine sound of a car, it may determine that the user gets into the vehicle. For example, the electronic device may store sound information corresponding to at least one engine sound.

According to one embodiment, the electronic device is capable of detecting the vibration of the electronic device based on the sensor unit. For example, if the electronic device continuously detects the vibration beyond the predetermined strength for the predetermined time, it may determine that the user gets into the vehicle. For example, the vehicle may be continuously vibrated due to the vibration of the vehicle in the vehicle. The electronic device detects that the vibration is continuously maintained to detect that the electronic device is in the vehicle.

According to one embodiment, the electronic device may receive the information of the external electronic device from the external electronic device. The electronic device can confirm whether or not the user gets into the vehicle by using the information received from the external electronic device. For example, the electronic device may be connected to the electronic device (e.g., car kit, navigation device or the like) included in the vehicle to receive the device information from the connected electronic device. The electronic device may determine that the user gets into the vehicle if the communicating external electronic device is the electronic device for the vehicle.

According to one embodiment, the electronic device may receive the information regarding another external electronic device connected to the mobile electronic device from the mobile electronic device (e.g., mobile phone, tablet or the like). For example, if the electronic device is connected to the mobile phone and the mobile phone is connected to the car navigation, the electronic device can receive, from the mobile phone, information indicating that the electronic device is connected to the navigation. The electronic device may determine that the user gets into the vehicle if the communicating electronic device is an electronic device for another vehicle.

According to one embodiment, the electronic device may adjust the setting of the electronic device under operation 1640 if the electronic device determines in operation 1630 that the user gets into the vehicle. If the electronic device determines that the user does not get into the vehicle, the electronic device may receive, process, and output the outside sound without changing the setting under operation 1670.

According to one embodiment, in operation 1640, the electronic device may control the directivity of the electronic device. For example, the electronic device may include at least one microphone. The electronic device may have the directivity in which the outside sound is received. For example, the electronic device may amplify and output only the sound received in the specific direction. For example, the electronic device may interrupt sounds received in directions other than the specific direction, or output the sounds in a small volume. If the electronic device determines that the user gets into the vehicle, the directivity may be changed. For example, the electronic device may change the directivity set as the forward direction of the user to the lateral direction or the back direction. According to one embodiment, if the electronic device determines that the user gets into the vehicle, the directivity may be changed to the non-directivity. According to one embodiment, the electronic device may operatively differently change the directivity according to the moving speed.

According to one embodiment, in operation 1650, the electronic device may change the auditory parameter. For example, the electronic device may change the noise attenuation amount, the amplification value of the sound or the like. For example, an electronic device may adjust the attenuation amount or the amplification value for single-shot pulse input signals (e.g., horn sound, crash sound, traveling sound of the surrounding vehicle or the like), which are generally processed with noise. For example, if the electronic device determines that the user gets into the vehicle, the electronic device may output a predetermined type of sound, which has been set as noise, without interrupting the sound.

According to one embodiment, in operation 1660, the electronic device may adjust a frequency range of the sound to be output. For example, the electronic device may adjust the filter value if it is determined that the user gets into the vehicle. For example, the electronic device may adjust the filter characteristics to change a frequency band of the sound to be output.

According to one embodiment, in operation 1670, the electronic device may acquire the sound information from the outside. For example, the electronic device may receive the outside sound and generate the received outside sound as the input signal.

According to one embodiment, in operation 1680, the electronic device may process and output the acquired sound information according to the setting. For example, the electronic device may amplify and output the sound in the specific direction according to the set directivity.

Figure 17:
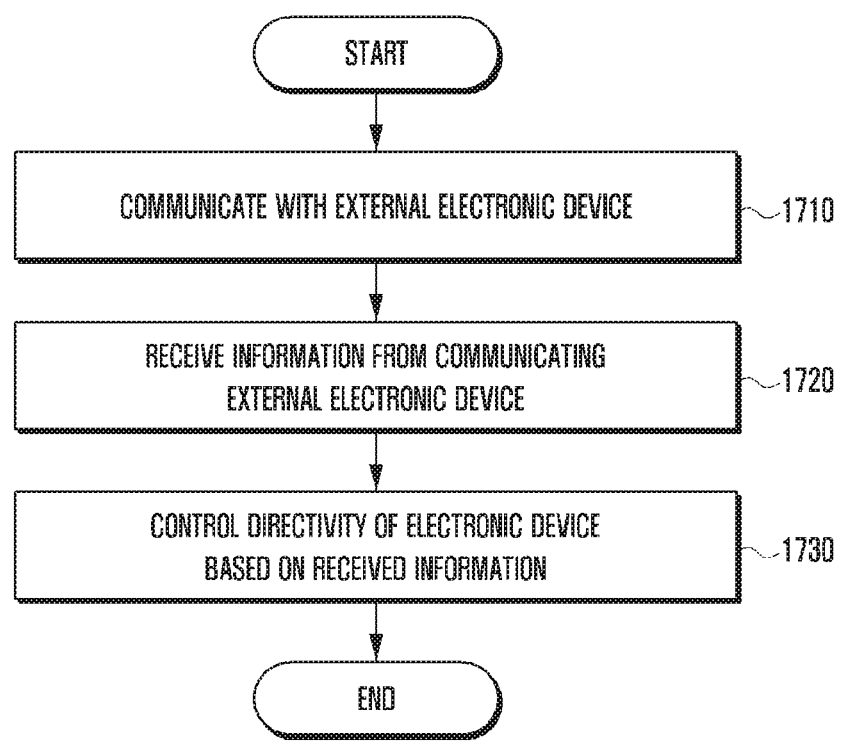
FIG. 17 is a flow chart of the method for controlling an operation of an electronic device according to the embodiment of the present disclosure.

FIG. 17 is a flow chart of the method for controlling an operation of an electronic device according to the embodiment of the present disclosure.

According to one embodiment, in operation 1710, the electronic device may communicate with the external electronic device. For example, the electronic device may communicate with the external electronic device in a wired or wireless manner. According to the embodiment, the electronic device may search for the electronic device which can be connected to the surrounding. The electronic device may establish the communication connection with the external electronic device in response to the communication connection request received from the external electronic device.

According to one embodiment, in operation 1720, the electronic device may receive the information from the communicating external electronic device. For example, the electronic device may receive the device information of the communicating external electronic device. For example, the electronic device may receive the information regarding the kind of the communicating external electronic device.

According to one embodiment, in operation 1730, the electronic device may control the directivity of the electronic device based on the received information. For example, the electronic device may receive the device information of the communicating external electronic device.

For example, the electronic device may determine whether or not the communicating external electronic device is the home electronic device (e.g., smart TV or the like), the mobile electronic device (e.g., mobile phone, tablet or the like), or the electronic device for the vehicle (e.g., car kit, navigation or the like). The electronic device may control the directivity according to the kind or the usage of the communicating external electronic device. For example, if the electronic device is connected to the electronic device for the vehicle, the electronic device may change the directivity in which the sound is received from the forward direction to the lateral or backward direction.

According to various embodiments of the present disclosure, the electronic device may adjust various setting values such as the auditory parameter, the filter setting value, and the noise attenuation amount as well as the directivity according to the information of the connected electronic device. For example, the electronic device may set the directivity in the direction in which the connected electronic device is positioned or amplify and output the sound output from the connected electronic device even larger than the surrounding sound. For example, the electronic device may filter and remove the surrounding sound other than the sound of the connected electronic device.

According to various embodiments of the present disclosure, there is provided a method of controlling an operation of an electronic device. The method may include: an operation of at least temporarily storing data regarding a sound received through a microphone; an operation of outputting a sound corresponding to a sound received from a first direction among the data through a speaker; and an operation of outputting a sound corresponding to a sound received from a second direction among the data through the speaker based at least in part on information regarding a state of the electronic device and/or information acquired from an outside of the electronic device.

The information regarding the state of the electronic device may include at least one of a moving speed of the electronic device, a sound received by the electronic device, a movement of the electronic device, and a position of the electronic device. The information acquired from the outside may include information of the external electronic device connected to the electronic device.

The operation of outputting the sound corresponding to the sound received from the second direction among the data may include an operation of determining whether a user gets into a vehicle based at least in part on the information regarding the state of the electronic device and/or the information acquired from the outside of the electronic device, and if it is determined that the user gets into the vehicle, an operation of outputting the sound corresponding to the sound received from the second direction among the data through the speaker.

According to one embodiment, if the electronic device receives the predetermined type of sound, the method may determine that the user of the electronic device gets into the vehicle.

The method may determine that the user of the electronic device gets into the vehicle if the electronic device continuously detects vibrations beyond a predetermined strength for a predetermined time.

The method may determine that the user of the electronic device gets into the vehicle if the moving speed of the electronic device is equals to or higher than the predetermined speed.

According to one embodiment, the method may further include: an operation of confirming the kind of the external electronic device connected to the electronic device based on the information acquired from the outside; and an operation of outputting the sound corresponding to the sound received from the specific direction among the data through the speaker based on the kind of the confirmed external electronic device.

According to the method, the electronic device may adjust a frequency range of a sound to be transmitted to a user among the sounds received from the outside if it is determined that the user gets into the vehicle.

The method may further include: an operation of outputting the sound corresponding to the sound received from the second direction among the data through the speaker if the moving speed of the electronic device is equal to or higher than the first speed; and an operation of outputting a sound corresponding to a sound received from a third direction among the data if the moving speed of the electronic device is equal to or higher than the second speed larger than the first speed.

The method may adjust the auditory parameter of the electronic device if it is determined that the user gets into the vehicle.

A method of controlling an operation of an electronic device according to various embodiments of the present disclosure may include: an operation of storing data regarding a sound received through a microphone; an operation of determining whether a user of the electronic device gets into a vehicle; if it is determined that the user of the electronic device gets into the vehicle, an operation of adjusting filter characteristics of the electronic device; and an operation of outputting the sound corresponding to the data through a speaker according to the adjusted filter characteristics.

According to one embodiment, the method may further include: an operation of outputting a sound corresponding to the sound received from the first direction among the data through the speaker; and if it is determined that the user of the electronic device gets into the vehicle, an operation of outputting a sound corresponding to the sound received from the second direction among the second direction.

It will be appreciated that the embodiments of the present disclosure described above may be implemented in hardware, software, or a combination of hardware and software. Any software may be stored in volatile or non-volatile storage devices such as a ROM, memories such as a RAM, a memory chip, a device, and an integrated circuit, or a recording medium which may be read with a machine (e.g., computer) simultaneously with being optically or magnetically recorded such as a CD, a DVD, a magnetic disk, and a magnetic tape, regardless of whether it may be deleted or rewritten.

The electronic device and the method of controlling an operation of an electronic device of the present disclosure may be implemented by a computer, a portable terminal, or an electronic device (e.g., hearing aids) including a processor and a memory, and the memory may be one example of the recording medium which may be read with a machine suitable to store a program including a program or programs including commands executing the embodiments of the present disclosure. Accordingly, the present disclosure include a program including codes for implementing the apparatus or the method recited in any of claims herein, and a recording medium which can be read with a machine (computer or the like) for storing the program In addition, such a program may be electronically transmitted through any medium, such as a communication signal transmitted over a wired or wireless connection, and the present disclosure suitably includes equivalents thereof. In addition, a method of utilizing a use log of a portable terminal and an apparatus using the log may receive and store the program from a program providing apparatus connected in a wired or wireless manner. In addition, the user may adjust the settings of the user portable terminal to limit the operation according to the embodiment of the present disclosure to the user terminal or to optionally use one extending by the interworking with the server through the network.

The invention claimed is:

1. An electronic device, comprising:
a housing;
at least one microphone included in the housing and configured to receive a sound and to detect a direction in which the sound is received;
at least one speaker included in the housing;
at least one communication circuit included in the housing;
at least one memory; and
at least one processor electrically connected to the at least one microphone, the at least one speaker, the at least one communication circuit, and the at least one memory, the at least one processor is configured to:
control the at least one memory to store data regarding a sound, which has been received through the microphone,
control the at least one speaker to output a sound, which corresponds to a sound received from a first direction among the data, and
control the at least one speaker to output a sound,
wherein the at least one processor is further configured to determine that a user of the electronic device gets into a vehicle based on detection of vibrations of at least a predetermined strength for at least a predetermined time.

2. The electronic device of claim 1, wherein the sound corresponds to a sound received from at least one direction among the data, based at least in part on information regarding a state of the electronic device or information acquired from outside of the electronic device.

3. The electronic device of claim 1, wherein the at least one processor is further configured to:
control output of a sound corresponding to the sound received from a second direction among the data through the speaker if the user gets into the vehicle.

4. The electronic device of claim 2, wherein the information regarding the state of the electronic device includes at least one of a moving speed of the electronic device, a sound received by the electronic device, and a position of the electronic device, and
the information acquired from the outside includes information of an external electronic device connected to the electronic device.

5. The electronic device of claim 2, wherein the information regarding the state of the electronic device includes a movement of the electronic device.

6. The electronic device of claim 1, wherein the at least one processor is further configured to adjust filter characteristics of the electronic device if the user gets into the vehicle.

7. The electronic device of claim 1, wherein the at least one processor is further configured to adjust an auditory parameter of the electronic device if the user gets into the vehicle.

8. The electronic device of claim 1, wherein the at least one processor is further configured to acquire the information of the external electronic device from the external electronic device,
to confirm a kind of the external electronic device based at least in part on the acquired information, and
to output a sound corresponding to the sound received from the second direction among the data through the speaker based on the kind of the confirmed external electronic device.

9. An electronic device, comprising:
a housing including a portion configured to be attached to/detached from a part of a user's ear;
at least one microphone included in the housing and configured to receive a sound from the outside and to detect a direction in which the sound is received;
at least one speaker included in the housing;
at least one communication circuit included in the housing;
at least one memory; and
at least one processor included in the housing and electrically connected to the at least one microphone, the at least one speaker, and the at least one communication circuit and the at least one memory, the at least one processor configured to:
communicate with an external electronic device,
confirm a kind of the communicating external electronic device, and
control the speaker to output a sound which corresponds to a sound received from at least one direction among the data,
wherein the at least one processor is further configured to determine that a user of the electronic device gets into a vehicle based on detected vibrations of a predetermined strength for a predetermined time.

10. The electronic device of claim 9, wherein the sound received from at least one direction among the data is based at least in part on information regarding a state of the electronic device or the kind of the communicating external electronic device.

11. A method for controlling an operation of an electronic device, comprising:
storing data regarding a sound received through a microphone;
outputting a sound, which corresponds to a sound received from a first direction among the data, through the speaker;
outputting a sound, which corresponds to a sound received from a second direction among the data, through the speaker based at least in part on information regarding a state of the electronic device or information acquired from outside of the electronic device; and
determining that a user of the electronic device gets into a vehicle, based on the electronic device detecting vibrations beyond a predetermined strength for a predetermined time.

12. The method of claim 11, wherein the information regarding the state of the electronic device include at least one of a moving speed of the electronic device, a sound received by the electronic device, and a position of the electronic device, and
the information acquired from the outside includes information of an external electronic device connected to the electronic device.

13. The method of claim 12, wherein determining that the user of the electronic device gets into the vehicle is further based on the moving speed of the electronic device being greater than or equal to a predetermined speed.

14. The method of claim 12, further comprising:
outputting the sound corresponding to the sound received from the second direction among the data through the speaker if the moving speed of the electronic device is greater than or equal to a first speed; and
outputting a sound corresponding to a sound received from a third direction among the data through the speaker if the moving speed of the electronic device is greater than or equal to a second speed different than the first speed.

15. The method of claim 11,
further comprising outputting a sound corresponding to the sound received from the second direction among the data through the speaker based on determining that the user gets into the vehicle.

16. The method of claim 11, wherein determining that the user of the electronic device gets into the vehicle is further based on the electronic device receiving a predetermined type of sound.

17. The method of claim 11, wherein the determining that the user gets into the vehicle is based at least in part on the information regarding the state of the electronic device or the information acquired from the outside of the electronic device.

18. The method of claim 11, further comprising:
confirming a kind of the external electronic device connected to the electronic device based on the information acquired from the outside; and
outputting the sound corresponding to the sound received from the specific direction among the data through the speaker, based on the kind of the confirmed external electronic device.

19. The method of claim 11, wherein the electronic device adjusts a frequency range of the sound to be transmitted to the user among the sounds received from the outside based on determining that the user gets into the vehicle.

20. The method of claim 11, further comprising:
adjusting an auditory parameter of the electronic device.

* * * * *